United States Patent
Chen et al.

(10) Patent No.: US 12,556,722 B2
(45) Date of Patent: Feb. 17, 2026

(54) PICTURE DECODING METHOD AND APPARATUS, AND PICTURE ENCODING METHOD AND APPARATUS

(71) Applicant: HANGZHOU HIKVISION DIGITAL TECHNOLOGY CO., LTD., Hangzhou (CN)

(72) Inventors: Fangdong Chen, Hangzhou (CN); Yan Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/709,164

(22) PCT Filed: Nov. 10, 2022

(86) PCT No.: PCT/CN2022/131032
§ 371 (c)(1),
(2) Date: Jul. 11, 2024

(87) PCT Pub. No.: WO2023/083239
PCT Pub. Date: May 19, 2023

(65) Prior Publication Data
US 2025/0047881 A1    Feb. 6, 2025

(30) Foreign Application Priority Data
Nov. 11, 2021 (CN) .......................... 202111335613.7

(51) Int. Cl.
*H04N 19/196* (2014.01)
*H04N 19/105* (2014.01)
(Continued)

(52) U.S. Cl.
CPC ......... *H04N 19/196* (2014.11); *H04N 19/105* (2014.11); *H04N 19/119* (2014.11);
(Continued)

(58) Field of Classification Search
CPC ................................................ H04N 19/196
See application file for complete search history.

(56) References Cited

U.S. PATENT DOCUMENTS

| 2019/0110045 A1* | 4/2019 | Zhao ................... H04N 19/105 |
| 2019/0166373 A1 | 5/2019 | Zhu et al. |

(Continued)

FOREIGN PATENT DOCUMENTS

| CN | 101394565 | 3/2009 |
| CN | 109479144 | 3/2019 |

(Continued)

OTHER PUBLICATIONS

Notice of Allowances in Chinese Appln. No. 202111335613.7, mailed on Sep. 4, 2024, 8 pages (with English translation).
(Continued)

*Primary Examiner* — Jerry T Jean Baptiste
(74) *Attorney, Agent, or Firm* — Fish & Richardson P.C.

(57) ABSTRACT

The present disclosure discloses picture decoding methods and apparatuses, and picture encoding methods and apparatuses, relating to the field of video coding and decoding technologies, and solving the problem of low prediction efficiency in a process of picture coding and decoding (or video coding and decoding). The picture decoding method includes: parsing a bit stream to obtain a syntax element, where the syntax element is configured to obtain a residual block of a to-be-decoded unit, and the to-be-decoded unit includes at least one prediction group; determining a prediction mode of any one prediction group in the at least one prediction group; obtaining a prediction value of the any one prediction group by performing prediction for the any one prediction group with the prediction mode; and decoding the to-be-decoded unit based on the residual block of the
(Continued)

to-be-decoded unit and the prediction value of each one in the at least one prediction group.

16 Claims, 12 Drawing Sheets

(51) Int. Cl.
*H04N 19/119* (2014.01)
*H04N 19/167* (2014.01)
*H04N 19/176* (2014.01)
*H04N 19/70* (2014.01)

(52) U.S. Cl.
CPC ......... *H04N 19/167* (2014.11); *H04N 19/176* (2014.11); *H04N 19/70* (2014.11)

(56) References Cited

U.S. PATENT DOCUMENTS

| 2020/0280742 | A1 | 9/2020 | Ramasubramonian et al. |
| 2022/0132102 | A1 | 4/2022 | Heo et al. |
| 2024/0291968 | A1* | 8/2024 | Paluri ................. H04N 19/176 |

FOREIGN PATENT DOCUMENTS

| CN | 111327904 A | 6/2020 |
| CN | 111698504 | 9/2020 |
| CN | 113038125 | 6/2021 |
| CN | 113475068 | 10/2021 |
| CN | 113574871 | 10/2021 |
| JP | 2015-005903 A | 1/2015 |
| JP | 2017-527194 A | 9/2017 |
| JP | 2019-528621 A | 10/2019 |
| KR | 20210130728 A | 11/2021 |
| WO | WO 2018003008 A1 | 1/2018 |
| WO | WO 2020176634 A1 | 9/2020 |

OTHER PUBLICATIONS

International Search Report in International Appln. No. PCT/CN2022/131032, mailed on Jan. 12, 2023, 5 pages (with English Translation).

International Written Opinion in International Appln. No. PCT/CN2022/131032, mailed on Jan. 12, 2023, 6 pages (with English Machine/Partial Translation).

Office Action in Japanese Appln. No. 2024-527663, mailed on Mar. 25, 2025, 8 pages (with machine translation).

Office Action in Korean Appln. No. 10-2024-7019255, Feb. 20, 2025, 11 pages (with machine translation).

* cited by examiner

PICTURE DECODING METHOD AND APPARATUS, AND PICTURE ENCODING METHOD AND APPARATUS

CROSS-REFERENCE TO RELATED APPLICATION

The present application is a U.S. National Stage of International Application No. PCT/CN2022/131032, filed on Nov. 10, 2022, which claims the benefit of priority to Chinese Application No. 202111335613.7, filed on Nov. 11, 2021, the contents of all of which are incorporated by reference herein in their entireties for all purposes.

TECHNICAL FIELD

The present disclosure relates to the field of video coding and decoding technologies, and in particular to picture decoding methods and apparatuses, and picture coding methods and apparatuses, picture codec systems, electronic devices, and computer-readable storage media.

BACKGROUND

A complete picture in a video is usually named as a "frame", and a video composed of many frames in chronological order is named as a "video sequence". There are a series of redundant information in video sequences, such as spatial redundancy, temporal redundancy, visual redundancy, information entropy redundancy, structural redundancy, knowledge redundancy, importance redundancy and so on. In order to remove redundant information from video sequences as much as possible and reduce the amount of data representing video, video coding technology is proposed to reduce storage space and save transmission bandwidth. Video coding technology is also named as video compression technology.

With the continuous development of technology, it is becoming more and more convenient to collect video data, and the scale of the collected video data is getting bigger and bigger, therefore, how to effectively code and decode the video data has become an urgent problem to be solved.

SUMMARY

The present disclosure provides picture decoding methods and apparatuses, picture coding methods and apparatuses, picture codec systems, electronic devices, and computer-readable storage media, which solve the problem of low prediction efficiency in a process of picture coding and decoding (or video coding and decoding).

In a first aspect, the present disclosure provides a picture decoding method, including: parsing a bit stream to obtain a syntax element, where the syntax element is configured to obtain a residual block of a to-be-decoded unit, and the to-be-decoded unit includes at least one prediction group; determining, for any one prediction group in the at least one prediction group, a prediction mode of the prediction group; obtaining, for any one prediction group in the at least one prediction group, a prediction value of the prediction group by performing prediction for the prediction group with the prediction mode; and decoding the to-be-decoded unit based on the residual block of the to-be-decoded unit and the prediction value of each one in the at least one prediction group.

In this way, compared to the technical solution of performing prediction directly for the coding unit itself, it helps to realize flexible prediction for the coding unit, for example, by reasonably setting the partition mode, it helps to realize performing prediction for a plurality of prediction groups in parallel, as well as setting different prediction modes for different prediction groups, etc., so as to improve the prediction efficiency, and thereby improve the coding efficiency.

In a possible implementation, the any one prediction group includes: a row of pixels in the to-be-decoded unit; or, a column of pixels, consecutive columns of pixels, consecutive odd columns of pixels, or consecutive even columns of pixels in the to-be-decoded unit.

In a possible implementation, where the at least one prediction group includes a plurality of prediction groups, and at least two prediction groups in the plurality of prediction groups are of different prediction modes.

In a possible implementation, the prediction mode of the any one prediction group includes at least one of horizontal prediction, vertical prediction, horizontal mean prediction or vertical mean prediction. Or, the prediction mode of the any one prediction group includes reference prediction performed by using a pixel value of a decoding unit neighbouring to the to-be-decoded unit, or using pixel values of an independent decoding unit neighbouring to an independent coding unit where the to-be-decoded unit is located.

In a possible implementation, the any one prediction group is a chroma prediction group or a luma prediction group.

In a possible implementation, the syntax element further includes identification information for a partitioning mode for the to-be-decoded unit, where the partitioning mode indicates a partitioning mode for partitioning the to-be-decoded unit into the at least one prediction group.

In a possible implementation, the syntax element further includes the prediction mode of the any one prediction group.

In a possible implementation, the syntax element further includes a first indicator to indicate whether to perform grouping on the residual block or not.

In a possible implementation, the residual block includes a luma residual block or a chroma residual block.

In a possible implementation, the residual block is a residual block of to-be-decoded unit granularity or a residual block of prediction block granularity.

In a second aspect, the present disclosure provides a picture coding method, including: partitioning a coding unit into at least one prediction group; for any one prediction group in the at least one prediction group, obtaining a prediction value of the any one prediction group by performing prediction for the any one prediction group with a corresponding prediction mode; obtaining a residual block of the coding unit based on the prediction value of each one in the at least one prediction group; and coding the residual block of the coding unit.

In this way, compared to the technical solution of performing prediction directly for the to-be-decoded unit itself, it helps to realize flexible prediction for the to-be-decoded unit, for example, by reasonably setting the partition mode, it helps to realize performing prediction for a plurality of prediction groups in parallel, as well as setting different prediction modes for different prediction groups, etc., so as to improve the prediction efficiency, and thereby improve the decoding efficiency.

In a third aspect, the present disclosure provides a picture decoding apparatus, which may be a video decoder or a device including a video decoder. The decoding apparatus includes modules for implementing the method in any possible implementation of the first aspect. Such as an entropy decoding unit, a prediction processing unit, and a decoding unit.

Beneficial effects can be found in the description of any of the aspects of the first aspect and will not be repeated here. The decoding apparatus has a function of realizing the behavior in the method example of the first aspect described above. The functions can be realized by hardware, or by hardware executing corresponding software. The hardware or software includes one or more modules corresponding to the above functions.

In a fourth aspect, the present disclosure provides a picture coding apparatus, which may be a video coder or a device including a video coder. The coding apparatus includes modules for implementing the method in any possible implementation of the second aspect. Such the coding apparatus includes: a partitioning unit, a prediction processing unit, a residual calculation unit, and a coding unit.

Beneficial effects can be found in the description of any of the aspects of the second aspect and will not be repeated here. The coding apparatus has a function of realizing the behavior in the method example of any one of the second aspect described above. The functions can be realized by hardware, or by hardware executing corresponding software. The hardware or software includes one or more modules corresponding to the above functions.

In a fifth aspect, the present disclosure provides an electronic device, including a processor and a memory, the memory is configured to store computer instructions, and the processor is configured to call and run the computer instructions from the memory to realize the method of any of the first to second aspects.

For example, the electronic device may refer to a video coder, or a device including a video coder.

As another example, the electronic device may refer to a video decoder, or a device including a video decoder.

In a sixth aspect, the present disclosure provides a computer-readable storage medium, in which a computer program or instruction is stored, and when the computer program or instruction is executed by a computing device or a storage system where the computing device is located, the method of any one of the first to second aspects can be realized.

In a seventh aspect, the present disclosure provides a computer program product, which includes instructions, and when the computer program product is run on a computing device or a processor, the computing device or the processor is caused to execute the instructions, so as to realize the method of any one of the first to second aspects.

In an eighth aspect, the present disclosure provides a picture codec system, which includes a coding side and a decoding side, where the decoding side is configured to realize the method in any one of the first aspects, and the coding side is configured to realize the method in any one of the second aspects.

In a ninth aspect, the present disclosure provides a picture decoding method, including: parsing a bit stream to obtain a syntax element, where the syntax element is configured to obtain a residual block of a to-be-decoded unit, the to-be-decoded unit includes at least one prediction group, a width dimension of the to-be-decoded unit is greater than a height dimension of the to-be-decoded unit, and the height dimension is less than or equal to a preset threshold; determining, for any one prediction group in the at least one prediction group, a prediction mode of the prediction group; obtaining, for any one prediction group in the at least one prediction group, a prediction value of the prediction group by performing prediction for the prediction group with the prediction mode; and decoding the to-be-decoded unit based on the residual block of the to-be-decoded unit and the prediction value of each one in the at least one prediction group.

In a possible implementation, the at least one prediction group is obtained by: partitioning the to-be-decoded unit into a plurality of prediction groups in a vertical equal partition manner; or, partitioning the to-be-decoded unit into a plurality of prediction groups in a horizontal equal partition manner; or, partitioning the to-be-decoded unit into a plurality of prediction groups along a vertical direction according to a preset proportion; or, partitioning the to-be-decoded unit into a plurality of prediction groups along a horizontal direction according to a preset proportion.

In a possible implementation, partitioning the to-be-decoded unit into a plurality of prediction groups in a horizontal equal partition manner includes: when a size of the to-be-decoded unit is 16*2, horizontally and equally partitioning the to-be-decoded unit into four prediction groups.

In a possible implementation, when the size of the to-be-decoded unit is 16*2, the at least one prediction group includes: a first prediction group including odd columns of pixels and a second prediction group including even columns of pixels, where a prediction mode of the first prediction group is vertical prediction, a prediction mode of pixels in column 16 of the second prediction group is horizontal prediction, and a prediction mode of other pixels except pixels in column 16 is horizontal mean prediction.

In a possible implementation, when the size of the to-be-decoded unit is 8*1, the at least one prediction group includes a prediction group and a prediction mode of the prediction group is vertical prediction.

In a possible implementation, the syntax element is specifically configured to obtain the residual block by obtaining at least one residual sub-block partitioned from the residual block.

In a possible implementation, the syntax element further includes index information of a grouping manner for the residual block, and different index information indicates different grouping manners.

In a possible implementation, the grouping manner for the residual block includes five grouping manners, an index of the grouping manner for the residual block adopts a binary coding method, and the grouping manner of the residual block is represented by one bit or three bits.

In a possible implementation, the syntax element includes a high-level syntax, providing unified information for a covered region, wherein the high-level syntax includes at least one of: bit depth, configured to represent a bit depth of a block within a certain region; whether to code an original value flag, configured to indicate whether a block within a region directly code an original pixel value; basic picture information, configured to represent basic information of a picture in the region; parallel coding unit syntax and restriction, configured to transmit size related information of a parallel independent coding unit in the region.

In a tenth aspect, the present disclosure provides a picture coding method, including; partitioning a coding unit into at least one prediction group, where a width dimension of the coding unit is greater than a height dimension of the coding unit, and the height dimension is less than or equal to a preset threshold; for any one prediction group in the at least one prediction group, obtaining a prediction value of the any one prediction group by performing prediction for the any one prediction group with a corresponding prediction mode; obtaining a residual block of the coding unit based on the prediction value of each one in the at least one prediction group; and coding the residual block of the coding unit.

In an eleventh aspect, the present disclosure provides a picture decoding apparatus, including: an entropy decoding unit, configured to parse a bit stream to obtain a syntax element, where the syntax element is configured to obtain a residual block of a to-be-decoded unit, the to-be-decoded unit includes at least one prediction group, a width dimension of the to-be-decoded unit is greater than a height dimension of the to-be-decoded unit, and the height dimension is less than or equal to a preset threshold; a prediction processing unit, configured to determine, for any one prediction group in the at least one prediction group, a prediction mode of the prediction group, obtain, for any one prediction group in the at least one prediction group, a prediction value of the prediction group by performing prediction for the prediction group with the prediction mode; and a decoding unit, configured to decode the to-be-decoded unit based on the residual block of the to-be-decoded unit and the prediction value of each one in the at least one prediction group.

In a twelfth aspect, the present disclosure provides a picture coding apparatus, including: a partitioning unit, configured to partition a coding unit into at least one prediction group, where the at least one prediction group includes at least one pixel, a width dimension of the coding unit is greater than a height dimension of the coding unit, and the height dimension is less than or equal to a preset threshold; a prediction processing unit, configured to, for any one prediction group in the at least one prediction group, obtain a prediction value of the any one prediction group by performing prediction for the any one prediction group with a corresponding prediction mode; a residual calculation unit, configured to obtain a residual block of the coding unit based on the prediction value of the any one prediction group; and a coding unit, configured to code the residual block of the coding unit.

In a thirteenth aspect, the present disclosure provides a picture codec system, which includes a coding side and a decoding side, the coding side is in communication connection with the decoding side, where the decoding side is configured to realize the method in any one of the ninth aspects, and the coding side is configured to realize the method in the tenth aspect.

In a fourteenth aspect, the present disclosure provides an electronic device, including a processor and a memory, the memory is configured to store computer instructions, and the processor is configured to call and run the computer instructions from the memory to realize the method of any of the ninth to tenth aspects.

In a fifteenth aspect, the present disclosure provides a computer-readable storage medium, in which a computer program or instruction is stored, and when the computer program or instruction is executed by a computing device or a storage system where the computing device is located, the method of any one of the ninth to tenth aspects can be realized.

The present disclosure may be further combined to provide additional implementations based on the implementations provided in the above aspects.

DETAILED DESCRIPTION

The term "at least one (species)" in embodiments of the present disclosure includes one (species) or multiple (species). "Multiple (species)" means two (species) or more than two (species). For example, at least one of A, B or C includes: A exists alone, B exists alone, C exists alone, A and B exist together, A and C exist together, B and C exist together, and A, B and C exist together. In the description of the present disclosure, unless otherwise specified, "/" means "or", for example, A/B can mean A or B. In the present disclosure, "and/or" is only a kind of relationship that describes related objects, which means that there can be three kinds of relationships, for example, A and/or B, which can mean that A exists alone, A and B exist together, and B exists alone. "Multiple" means two or more. In addition, in order to facilitate a clear description of technical solutions of embodiments of the present disclosure, in the embodiments of the present disclosure, words such as "first", "second", etc. are used to differentiate between the same or similar items having essentially the same functions and roles. Those skilled in the art can understand that the words "first" and "second" are not limited to the number and order of execution, and the words "first" and "second" are not necessarily different.

The following describes a system architecture applied by an embodiment of the present disclosure.

Figure 1:
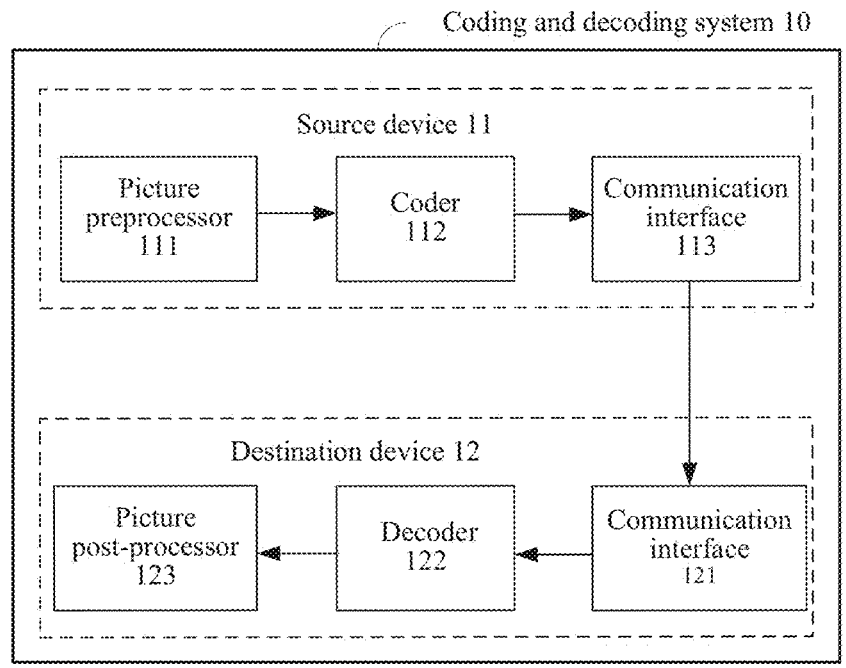
FIG. 1 is a schematic architectural diagram of a coding and decoding system applied in an embodiment of the present disclosure.

Referring to FIG. 1, a schematic architectural diagram of a coding and decoding system 10 applied in an embodiment of the present disclosure is given. As shown in FIG. 1, the coding and decoding system 10 may include a source device 11 and a destination device 12. The source device 11 is configured to code a picture, so the source device 11 may be named as a picture coding apparatus or a video coding apparatus. The destination device 12 is configured to decode coded picture data generated by the source device 11, so the destination device 12 can be named as a picture decoding apparatus or a video decoding apparatus.

The source device 11 and the destination device 12 may include various apparatuses, including desktop computers, mobile computing apparatuses, notebook (e.g., laptop) computers, tablet computers, set-top boxes, telephone handsets such as so-called "smart" phones, televisions, cameras, display apparatuses, digital media players, video game consoles, vehicle-mounted computers or the like.

Optionally, the source device 11 and destination device 12 in FIG. 1 can be two separate devices, or the source device 11 and destination device 12 can be a same device, meaning that the source device 11 or its corresponding functions and the destination device 12 or its corresponding functions can be integrated on the same device.

The source device 11 and the destination device 12 may communicate with each other, for example, the destination device 12 may receive coded picture data from the source device 11. In an example, one or more communication media may be included between the source device 11 and the destination device 12, and coded picture data is transmitted through the one or more communication media, the one or more communication media may include routers, switches, base stations or other devices that facilitate communication from the source device 11 to the destination device 12.

As shown in FIG. 1, the source device 11 includes a coder 112, and optionally, the source device 11 may further include a picture preprocessor 111 and a communication interface 113. The picture preprocessor 111 is configured to perform preprocessing on a received to-be-coded picture. For example, the preprocessing performed by the picture preprocessor 111 may include modifying, color format conversion (for example, converting from RGB format to YUV format), color toning or denoising. The coder 112 is configured to receive the preprocessed picture and process the preprocessed picture by adopting a correlation prediction mode (such as a prediction mode in various embodiments herein), thereby providing the coded picture data. In some embodiments, the coder 112 may be configured to perform a coding process in various embodiments described below. The communication interface 113 can be configured to transmit the coded picture data to the destination device 12 or any other device (such as a memory) for storage or direct reconstruction, and other devices can be any device for decoding or storage. The communication interface 113 can also package the coded picture data into a suitable format before transmitting.

Optionally, the picture preprocessor 111, the coder 112 and the communication interface 113 may be hardware components in the source device 11, or may be software programs in the source device 11, which are not limited in the embodiment of the present disclosure.

Continuing as shown in FIG. 1, the destination device 12 includes a decoder 122, and optionally, the destination device 12 may further include a communication interface 121, a picture post-processor 123. The communication interface 121 can be configured to receive the coded picture data from the source device 11 or any other source device, the any other source device being, for example, a storage device. The communication interface 121 may further decapsulate the data transmitted by the communication interface 113 to obtain the coded picture data. The decoder 122 is configured to receive the coded picture data and output decoded picture data (also named as reconstructed picture data). In some embodiments, the decoder 122 may be configured to perform a decoding process described in various embodiments described below.

The picture post-processor 123 is configured to perform post-processing on the decoded picture data to obtain post-processed picture data. The post-processing performed by the picture post-processor 123 may include: color format conversion (for example, converting from YUV format to RGB format), color toning, modifying or resampling, or any other processing, and may further be configured to transmit the post-processed picture data to a display device for display.

Similarly, optionally, the communication interface 121, the decoder 122 and the picture post-processor 123 may be hardware components in the destination device 12, or may be software programs in the destination device 12, which are not limited in the embodiment of the present disclosure.

The structure of the coder and decoder in FIG. 1 is briefly described below.

Figure 2:
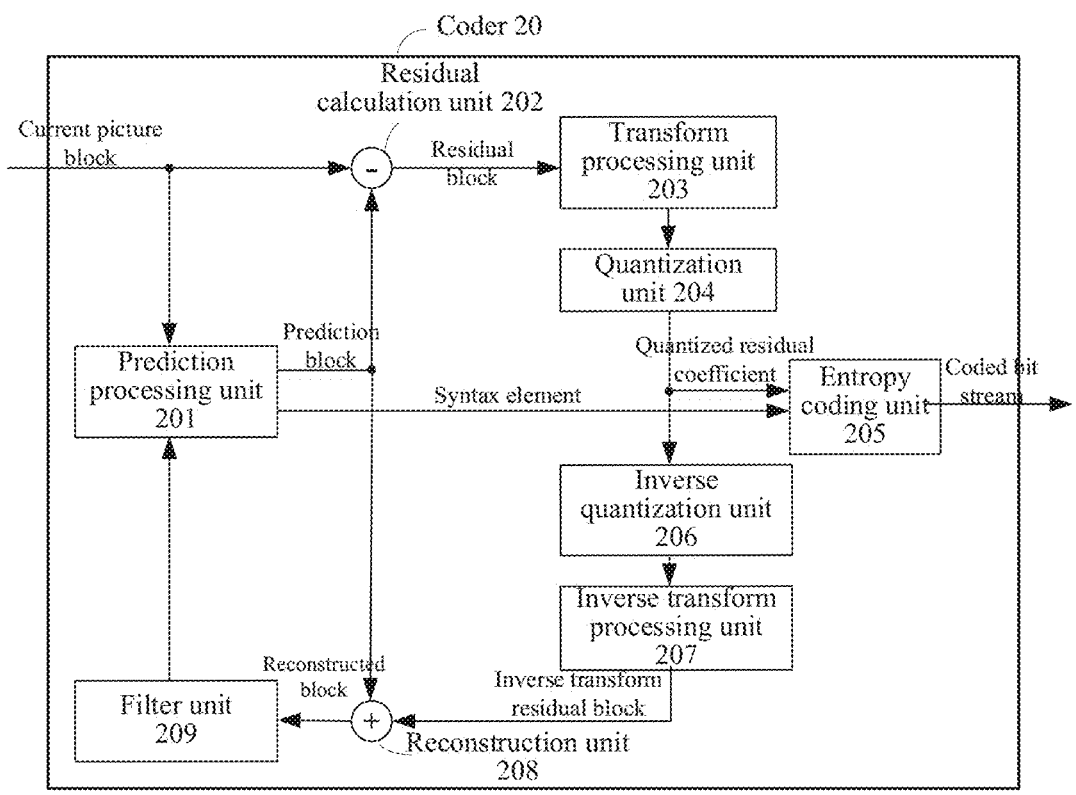
FIG. 2 is a schematic block diagram of an example of a coder for implementing an embodiment of the present disclosure.

Referring to FIG. 2, FIG. 2 illustrates a schematic block diagram of an example of a coder 20 for implementing an embodiment of the present disclosure. In FIG. 2, the coder includes a prediction processing unit 201, a residual calculation unit 202, a transform processing unit 203, a quantization unit 204, an entropy coding unit 205, an inverse quantization unit (also named as dequantization unit) 206, an inverse transform processing unit (also named as reverse transform processing unit) 207, a reconstruction unit (or named as rebuild unit) 208 and a filter unit 209. Optionally, the coder 20 may further include a buffer and a decoded picture buffer, where the buffer is configured to buffer a reconstructed picture block output by the reconstruction unit 208 and the decoded picture buffer is configured to buffer a filtered picture block output by the filter unit 209.

An input to the coder 20 is a picture block of a picture (which may be named as a to-be-coded picture), the picture block may also be named as a current picture block or a to-be-coded picture block, and in an embodiment of the present disclosure, the to-be-coded picture block may be a coding unit. The coder 20 may further include a segmentation unit (not shown in FIG. 2), which is configured to segment the to-be-coded picture into multiple picture blocks. The coder 20 is configured to code block by block thereby completing coding of the to-be-coded picture, e.g., performing the coding process for each picture block.

The prediction processing unit 201 is configured to receive or acquire the picture block (a current to-be-coded picture block of a current to-be-coded picture, which may also be named as a current picture block, which may be understood as a real value of the picture block) and reconstructed picture data, and obtain a prediction block of the current picture block by performing prediction for the current picture block based on relevant data in the reconstructed picture data. Optionally, the prediction processing unit 201 may include an inter-frame prediction unit, an intra-frame prediction unit, and a mode selection unit, the mode selection unit is configured to select an intra prediction mode or an inter prediction mode, and if the intra prediction mode is selected, the intra-frame prediction unit performs a prediction process, and if the inter prediction mode is selected, the inter-frame prediction unit performs a prediction process.

The residual calculation unit 202 is configured to obtain a residual block by calculating a residual value between the real value of the picture block and a prediction block of the picture block, for example, by subtracting a pixel value of the predicted block from a pixel value of the picture block pixel by pixel.

The transform processing unit 203 is configured to perform a transform, such as a discrete cosine transform (DCT) or a discrete sine transform (DST), on the residual block to obtain a transform coefficient in a transform domain, the transform coefficient may also be named as a transform residual coefficient, and the transform residual coefficient may represent the residual block in the transform domain.

The quantization unit 204 is configured to quantize the transform coefficient by applying scalar quantization or vector quantization to obtain a quantized transform coefficient, which can also be named as a quantized residual coefficient. A quantization process can reduce a bit depth associated with some or all of the transform coefficients. For example, a n-bit transform coefficient may be rounded down to a m-bit transform coefficient during quantization, where n is greater than m. A quantization degree can be modified by adjusting a quantization parameter (QP). For example, for scalar quantization, different scales can be applied to achieve finer or coarser quantization. A smaller quantization step corresponds to a finer quantization, while a larger quantization step corresponds to a coarser quantization. An appropriate quantization step can be indicated by a quantization parameter (QP).

The entropy coding unit 205 is configured to entropy code the quantized residual coefficient, and the coded picture data (i.e., a coding result of the current to-be-coded picture block) output in a form of a coded bit stream, and then transmit the coded bit stream to a decoder, or store it for later transmission to the decoder or for retrieval. The entropy coding unit 205 can further be configured to entropy code other syntax elements of the current picture block, such as entropy coding a prediction mode into a bit stream. Entropy coding algorithms include, but are not limited to, a variable length coding (VLC) algorithm, a context adaptive VLC (CAVLC) algorithm, an arithmetic coding algorithm, a context adaptive binary arithmetic coding, CABAC) algorithm, a syntax-based context-adaptive binary arithmetic coding (SBAC) algorithm, and a probability interval partitioning entropy (PIPE) algorithm.

The inverse quantization unit 206 is configured to perform inverse quantization on the aforementioned quantized coefficient to acquire an inverse quantized coefficient. The inverse quantization is a reverse application of the quantization unit 204, for example, based on or using the same quantization step as the quantization unit 204, an inverse quantization scheme of the quantization scheme applied by the quantization unit 204 is applied. The inverse quantized coefficient can also be named as inverse quantized residual coefficient.

The inverse transform processing unit 207 is configured to perform inverse transformation on the aforementioned inverse quantized coefficient. It should be understood that this inverse transform is a reverse application of the above-mentioned transform processing unit 203. For example, the inverse transform may include an inverse discrete cosine transform (DCT) or an inverse discrete sine transform (DST) to obtain an inverse transform block in a pixel domain (or sample domain). The inverse transform block can also be named as an inverse transform inverse-quantized block or inverse transform residual block.

The reconstruction unit 208 is configured to add the inverse transform block (i.e., inverse transform residual block) to the prediction block to obtain a reconstructed block in the sample domain. The reconstruction unit 208 can be a summator, for example, adding a sample value (i.e., pixel value) of the residual block to a sample value of the prediction block. The reconstructed block output by the reconstruction unit 208 can be subsequently configured to perform prediction for other picture blocks, for example, in an intra prediction mode.

The filter unit 209 (or simply named as "filter") is configured to filter the reconstructed block to obtain a filtered block, so as to smoothly perform pixel conversion or improve picture quality. The filter unit may be a loop filter unit, intended to represent one or more loop filters, such as a deblocking filter, a sample-adaptive offset (SAO) filter or other filters, such as a bilateral filter, an adaptive loop filter (ALF), a sharpening or smoothing filter, or a cooperative filter. Optionally, the filtered block output by the filter unit 209 may be subsequently configured to perform prediction for other picture blocks, for example, in an inter prediction mode.

Specifically, in an embodiment of the present disclosure, the coder 20 is configured to realize a coding method described in the embodiments described later.

Figure 3:
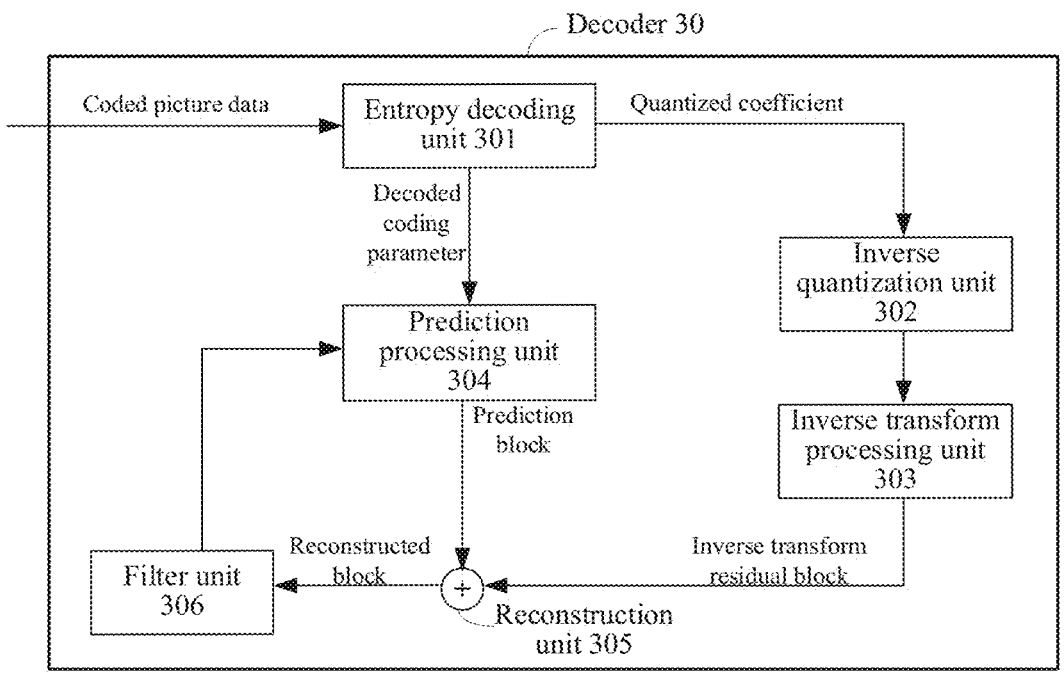
FIG. 3 is a schematic block diagram of an example of a decoder for implementing an embodiment of the present disclosure.

Referring to FIG. 3, FIG. 3 illustrates a schematic block diagram of an example of a decoder 30 for implementing an embodiment of the present disclosure. The decoder 30 is configured to obtain a decoded picture by receiving, for example, coded picture data (i.e., a coded bit stream, e.g., a coded bit stream including picture blocks and associated syntax elements) coded by the coder 20. The decoder 30 includes an entropy decoding unit 301, an inverse quantization unit 302, an inverse transform processing unit 303, a prediction processing unit 304, a reconstruction unit 305 and a filter unit 306. In some examples, the decoder 30 may perform a decoding pass that is substantially reciprocal to the coding pass described by the coder 20 of FIG. 2. Optionally, the decoder 30 may further include a buffer and a decoded picture buffer, where the buffer is configured to buffer a reconstructed picture block output by the reconstruction unit 305 and the decoded picture buffer is configured to buffer a filtered picture block output by the filter unit 306.

The entropy decoding unit 301 is configured to perform entropy decoding on coded picture data to obtain quantized coefficients and/or decoded coding parameters (for example, the decoding parameters may include any or all of inter prediction parameters, intra prediction parameters, filter parameters and/or other syntax elements). The entropy decoding unit 301 is further configured to forward the aforementioned decoded coding parameters to the prediction processing unit 304 for the prediction processing unit to perform a prediction process according to the coding parameters.

The function of the inverse quantization unit 302 can be the same as that of the inverse quantization unit 206 of the coder 20, configured to inverse quantization (i.e., dequantization) of a quantized coefficient decoded by the entropy decoding unit 301.

The function of the inverse transform processing unit 303 can be the same as that of the inverse transform processing unit 207 of the coder 20, and the function of the reconstruction unit 305 (e.g., summator) can be the same as that of the reconstruction unit 208 of the coder 20, and it is configured to perform inverse transform (e.g., inverse DCT, inverse integer transform or conceptually similar inverse transform process) on the aforementioned quantized coefficient to obtain an inverse transform block (also named as inverse transform residual block), that is, the inverse transform block is a residual block of the current picture block in the pixel domain.

The prediction processing unit 304 is configured to receive or acquire coded picture data (for example, the coded bit stream of the current picture block) and reconstructed picture data. The prediction processing unit 301 can further receive or acquire prediction related parameters and/or information about a selected prediction mode (i.e., decoded coding parameters) from, for example, the entropy decoding unit 301, and perform prediction for the current picture block based on relevant data in the reconstructed picture data and the decoded coding parameters to obtain a prediction block of the current picture block. Optionally, the prediction processing unit 304 may include an inter-frame prediction unit, an intra-frame prediction unit, and a mode selection unit, the mode selection unit is configured to select an intra prediction mode or an inter prediction mode, and if the intra prediction mode is selected, the intra-frame prediction unit performs a prediction process, and if the inter prediction mode is selected, the inter-frame prediction unit performs a prediction process.

The reconstruction unit 305 is configured to add an inverse transform block (i.e., an inverse transform residual block) to the prediction block to obtain a reconstructed block in a sample domain, for example, to add a sample value of the inverse transform residual block to a sample value of the prediction block.

The filter unit 306 is configured to filter the reconstructed block to obtain a filtered block, which is a decoded picture block.

Specifically, in an embodiment of the present disclosure, the decoder 30 is configured to realize a decoding method described in the embodiments described later.

It should be understood that in the coder 20 and decoder 30 of the embodiment of the present disclosure, a processing result for a certain link can also be further processed and output to a next link, for example, after interpolation filtering, motion vector derivation or filtering, a processing result of the corresponding link can be further subjected to operations such as Clip or shift.

Next, the technical terms involved in the embodiment of the present disclosure are introduced.

Partition mode: in an embodiment of the present disclosure, a partition mode indicates a partition manner for partitioning a current picture block (such as a to-be-coded/decoded unit) into prediction groups (i.e. prediction blocks).

Prediction mode: a combination of prediction modes used to perform prediction for a current picture block (such as a to-be-coded/decoded unit) is named as prediction mode. Different prediction methods or the same prediction method can be used to predict different pixels in the current picture block, and the prediction methods used to predict all pixels in the current picture block can be collectively called the prediction mode (or corresponding prediction mode) of the current picture block.

For example, the prediction modes include an intra prediction mode and an inter prediction mode. The intra prediction mode include one or more combinations of vertical prediction, horizontal prediction, vertical mean prediction and horizontal mean prediction. The inter prediction mode include motion estimation and so on.

For example, the vertical prediction is to obtain a prediction value of a current pixel value by using a pixel value of an upper side of a current pixel (that is, it can be a neighbouring upper side or a non-neighbouring but close upper side). An example is to take a reconstructed pixel value neighbouring to the upper side as the prediction value of the current pixel.

For example, the horizontal prediction is to obtain a prediction value of a current pixel value by using a pixel value of a left side of a current pixel (that is, it can be a neighbouring left side or a non-neighbouring but close left side). An example is to take a reconstructed pixel value neighbouring to the left side as the prediction value of the current pixel.

For example, the vertical mean prediction is to obtain a prediction value of a current pixel value with pixel values above and below a current pixel. An example is that the prediction value of the current pixel value is an average value of a neighbouring pixel value vertically above and a neighbouring pixel value vertically below.

For example, the horizontal mean prediction is to obtain a prediction value of a current pixel value with pixel values on left and right sides of a current pixel. An example is that the prediction value of the current pixel value is an average value of a neighbouring pixel value on the horizontal left and a neighbouring pixel value on the horizontal right.

Figure 4:
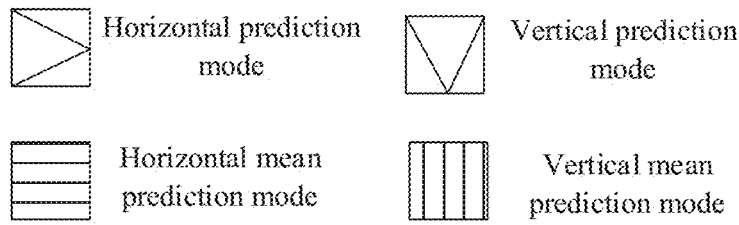
FIG. 4 is a schematic diagram of various prediction modes according to an embodiment of the present disclosure.

As shown in FIG. 4, FIG. 4 is a schematic diagram of various prediction methods according to an embodiment of the present disclosure. A small square in FIG. 4 represents a pixel. Pixels with different marks are used to represent different prediction modes, specifically showing vertical prediction, horizontal prediction, vertical mean prediction and horizontal mean prediction. The schematic diagram of various prediction modes shown in FIG. 4 can be used to explain any relevant accompanying drawings involved in the present disclosure, such as FIG. 8.

Hereinafter, the video coding and decoding method provided by the embodiments of the present disclosure will be described with reference to the accompanying drawings.

Figure 5:
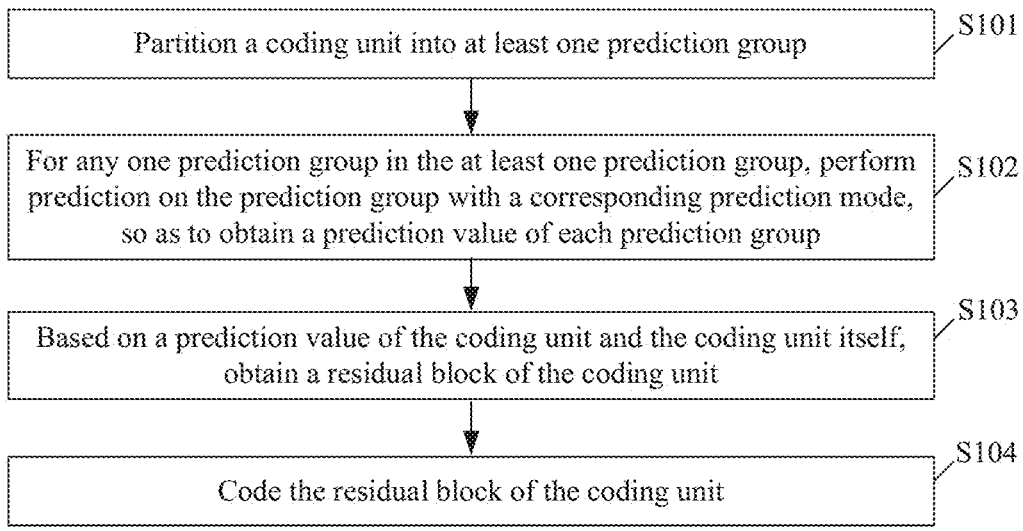
FIG. 5 is a flowchart of a picture coding method according to an embodiment of the present disclosure.

As shown in FIG. 5, FIG. 5 is a flowchart of a picture coding method according to an embodiment of the present disclosure. The method can be executed by a coding side. For example, the coding side may be the coder in FIG. 1 or FIG. 2 or the source device in FIG. 1. The method shown in FIG. 5 includes the following steps S101 to S104.

At step S101: a coding unit is partitioned into at least one prediction group (also named as Group or PG for short), and one prediction group includes at least one pixel.

In an example, a width dimension of the coding unit is greater than a height dimension of the coding unit, and the height dimension is less than or equal to a preset threshold. In an example, the preset threshold is 4 or 8, etc.

In S101, the coding unit can be partitioned into one prediction group or a plurality of non-overlapping prediction groups. The coding unit is partitioned into one prediction group, that is, the coding unit is regarded as a prediction group, which can be understood as not partitioning the coding unit, or as a special partition manner. If the coding unit is partitioned into one prediction group, in an example, the coding side may not perform S101.

In an implementation, one prediction group in at least one prediction group includes: a row of pixels in the coding unit; or, a column of pixels, consecutive columns of pixels, consecutive odd columns of pixels, or consecutive even columns of pixels in the coding unit. Specific examples can be found in FIGS. 8-15 or FIGS. 20-23.

In another implementation, the at least one prediction group is obtained by: partitioning the coding unit into a plurality of prediction groups in a vertical equal partition manner; or, partitioning the coding unit into a plurality of prediction groups in a horizontal equal partition manner; or, partitioning the coding unit into a plurality of prediction groups along a vertical direction according to a preset proportion; or, partitioning the coding unit into a plurality of prediction groups along a horizontal direction according to a preset proportion. Specific examples can be found in FIGS. 26-28.

It can be understood that when a coding unit is partitioned into at least one prediction group, various partition modes can be adopted, and which partition mode is used can be determined by the coding side based on predefined rules (such as rules predefined according to standards), or combined with content of the coding unit (e.g., information such as texture), or based on rate distortion cost, etc., which is not limited by the embodiment of the present disclosure. For a decoding side, it can be determined based on the same approach which partition mode is actually used on the coding side. If the coding side uses the latter two manners described above (and of course, other manners besides predefined) to determine exactly which partition mode is adopted, the coding side may also send information identifying the partition mode of the coding unit (i.e., an actual adopted partition mode) as part of syntax element to the decoding side, and the partition mode of the to-be-decoded unit corresponding to the coding unit may be determined by an identifier of the partition mode in the syntax element obtained by decoding.

At step S102: for any one prediction group in the at least one prediction group, prediction is performed on the prediction group (i.e., original value(s) of pixel value(s) of the prediction group) with a corresponding prediction mode, so as to obtain a prediction value of each prediction group (i.e., prediction value(s) of pixel value(s) of the prediction group).

One prediction group corresponds to one prediction mode. If a certain prediction mode is used to predict original value(s) of pixel value(s) of a certain prediction group, there is a corresponding relationship between the prediction mode and the prediction group.

In an example, a prediction mode corresponding to a prediction group may include one or more combinations of vertical prediction, horizontal prediction, vertical mean prediction and horizontal mean prediction.

In an example, a prediction mode corresponding to a prediction group may further include reference prediction performed by using a pixel value of a coding unit neighbouring to the coding unit, or reference prediction performed by using pixel values of an independent coding unit neighbouring to an independent coding unit where the coding unit is located.

In an example, the at least one prediction group includes a plurality of prediction groups. At least two prediction groups in the plurality of prediction groups are of different prediction modes. For example, a prediction mode of one prediction group is vertical prediction mode, and a prediction mode of another prediction group is horizontal mean prediction mode.

In an example, there is a correlation between partition mode and prediction mode. In other words, a partition mode of a coding unit is related to the prediction mode of each prediction group partitioned by the coding unit. Specifically, after the partition mode of a coding unit is determined, the prediction mode of each prediction group partitioned by the coding unit can be determined based on the correlation.

There is a corresponding relationship between a partition mode and one or more prediction modes.

When a partition mode corresponds to a prediction mode, for the coding side, when it is determined that the coding unit adopts the partition mode, an identifier of the prediction mode currently adopted by the prediction group partitioned under the partition mode (that is, when the step of S102 is executed) may not be carried in the bit stream.

For example, a predefined prediction mode 1 corresponds to a partition mode 1, where the partition mode 1 partitions the coding unit into prediction groups 1-4 and defines a position of each prediction block in the coding unit. The prediction mode 1 is specified as follows: the prediction modes for prediction groups 1-4 are, in order, vertical prediction, horizontal prediction, horizontal prediction and horizontal prediction. In this case, once the coding side/decoding side determines that the partition mode of coding unit/to-be-decoded unit is partition mode 1, it can be determined that the prediction modes of prediction groups 1-4 partitioned according to partition mode 1 are, in order, vertical prediction, horizontal prediction, horizontal prediction and horizontal prediction. Therefore, for the coding side, it is unnecessary to carry the identifier of the prediction mode currently adopted by the prediction group in this partition mode in the bit stream.

When a partition mode corresponds to multiple prediction modes, the coding side can determine which prediction mode is currently adopted by means of rate distortion cost. In an implementation, for the decoding side, which prediction mode is currently adopted can be determined based on the same method. In another implementation, the coding side can carry the identifier of the prediction mode currently adopted by the prediction group in the partition mode in the bit stream, and the decoding side can obtain which prediction mode is currently adopted by decoding the bit stream.

In an example, there is a correlation between prediction group and prediction mode. In other words, there is a corresponding relationship between a prediction group and a prediction mode of the prediction group. Specifically, after a prediction group is determined, the prediction mode of the prediction group can be directly determined.

There is a corresponding relationship between a prediction group and one or more prediction modes.

When a prediction group corresponds to a prediction mode, the coding side may not carry the identifier of the prediction mode currently adopted by the prediction group in the bit stream.

When a prediction group corresponds to multiple candidate prediction modes, the coding side can determine which prediction mode is currently adopted by means of rate distortion cost. In an implementation, for the decoding side, which prediction mode is currently adopted by the prediction group can be determined based on the same method. In another implementation, the coding side can carry the identifier of the prediction mode currently adopted by the prediction group in the bit stream.

At step S103: based on a prediction value of the coding unit and the coding unit itself (i.e., an original value of a pixel value of the coding unit), a residual block of the coding unit is obtained.

The prediction value of the coding unit is obtained from a prediction value of each prediction group partitioned by the coding unit. For any one of the at least one prediction group, a residual block of the prediction group is obtained based on the prediction value of the prediction group and the prediction group itself (i.e. the original value(s) of the pixel value(s) of the prediction group).

At step S104: the residual block of the coding unit is coded.

Specifically, operations such as transforming, quantizing, and coefficient coding are performed on the residual block of the coding unit.

In an example, the residual block of the coding unit is partitioned into at least one residual sub-block (RSB), i.e., operations such as transforming, quantizing, and coefficient coding are performed on each residual sub-block separately. The at least one residual sub-block includes one residual sub-block or a plurality of non-overlapping residual sub-blocks.

In some implementations, the residual block is a residual block of coding unit granularity. That is, when S104 is executed, a residual block of the coding unit as a whole (i.e., a residual block with a dimension equal to the coding unit) is partitioned into at least one residual sub-block. A dimension of the residual block of the coding unit is the same as a dimension of the coding unit.

In other implementations, the residual block is a residual block of prediction group granularity. That is, when S104 is executed, any one or more (e.g., each) prediction groups partitioned by the coding unit are partitioned into at least one residual sub-block. A dimension of a residual block of a prediction block is the same as a dimension of the prediction block.

In an example, the coding side carries a first indicator in a syntax element. The first indicator indicates whether to perform grouping on the residual block or not. For the decoding side, based on the first indicator, it can be known whether residual block grouping (or residual block partition) needs to be performed.

Specifically, the coder codes residual coefficients of each RB in the at least one residual sub-block (i.e., RSB) according to a selected mode to obtain a residual coefficient stream. Specifically, it can be divided into two categories: transforming the residual coefficients and not transforming the residual coefficients.

For the description of RB transform, RB partitioning, residual coefficient coding method, etc., please refer to the following.

According to the picture coding method provided by the embodiment of the present disclosure, the coding unit is partitioned into at least one prediction group, and the prediction group is predicted according to a prediction mode corresponding to the prediction group. In this way, compared to the technical solution of performing prediction directly for the coding unit itself, it helps to realize flexible prediction for the coding unit, for example, by reasonably setting the partition mode, it helps to realize performing prediction for a plurality of prediction groups in parallel, as well as setting different prediction modes for different prediction groups, etc., so as to improve the prediction efficiency, and thereby improving the coding efficiency.

Hereinafter, the coding method provided by embodiments of the present disclosure is described by a specific example.

At step 1: a frame of picture is divided into one or more non-overlapping parallel coding units, each of which has no dependency relationship and can be coded and decoded in parallel/independently.

At step 2: for each parallel coding unit, the coding side can partition it into one or more independent coding units that are not overlapped with each other, and the independent coding units can be independent of each other, but they can share some header information of the parallel coding unit.

If the parallel coding unit is partitioned into an independent coding unit, the dimension of the independent coding unit is the same as that of the parallel coding unit. Otherwise, a width dimension of the independent coding unit is generally larger than a height dimension of the independent coding unit. It should be noted that if an independent coding unit is located in an edge region of a parallel coding unit, there may be cases where the width dimension of the independent coding unit is less than or equal to the height dimension.

Mark the width of independent coding unit as w_lcu and the height as h_lcu. Both w_lcu and h_lcu are 2N, and N is an integer greater than or equal to 0. Generally, a dimension of an independent coding unit is a fixed w_lcu×h_lcu. For example, the dimension of an independent coding unit can be 128×4, 64×4, 32×4, 16×4, 8×4, 32×2, 16×2 or 8×2.

As an example, the dimension of the independent coding unit may be 128×4. If the dimension of the parallel coding unit is 256×8, the parallel coding unit can be equally partitioned into four independent coding units. If the dimension of the parallel coding unit is 288×10, the parallel coding unit can be partitioned into: two 128×4 independent coding units and one 32×4 independent coding unit in the first/second row, and two 128×2 coding units and one 32×2 coding unit in the third row.

The independent coding unit can contain three components of luma Y, chroma Cb, and chroma Cr (or three components of red R, green G, and blue B), or only one of these components. If it contains three components, their dimensions can be the same or different, which is related to a picture input format.

At Step 3: for each independent coding unit, the coding side can partition it into one or more non-overlapping coding units. Each coding unit within the independent coding unit can be interdependent, that is, they can refer to each other in the process of performing the prediction step.

If the independent coding unit is partitioned into one coding unit, the dimension of the coding unit is the same as that of the independent coding unit.

If an independent coding unit is partitioned into a plurality of non-overlapping coding units, the width dimension of the coding unit is generally larger than the height dimension. It should be noted that if a coding unit is located in an edge region of the independent coding unit, there may be cases where the width dimension of the coding unit is smaller than or equal to the height dimension.

If the independent coding unit is partitioned into a plurality of coding units that do not overlap each other, the partition manner may be a horizontal equal partition method, a vertical equal partition method, or a horizontal-vertical equal partition method. A specific implementation does not appear here.

Horizontal equal partition method, i.e., the height dimension of the coding unit is the same as the height dimension of the independent coding unit, but the width dimension of the two is different. For example, the width dimension of the coding unit can be ½, ¼, ⅛ or 1/16 of the width dimension of the independent coding unit.

Vertical equal partition method, i.e., the width dimension of the coding unit is the same as the width dimension of the independent coding unit, but the height dimension of the two is different. For example, the height dimension of the coding unit can be ½, ¼, ⅛ or 1/16 of the height dimension of the independent coding unit.

Horizontal-vertical equal partition method, namely quadtree partitioning.

Preferably, the coding side partitions the independent coding unit into a plurality of non-overlapping coding units in a horizontal equal partition manner.

Mark the width of the coding unit as w_cu and the height as h_cu. Both w_cu and h_cu are 2N and N is an integer greater than or equal to 0. Generally, a dimension of coding unit is a fixed w_cu×h_cu, for example, the dimension of coding unit can be 16×4, 8×4, 16×2, 8×2, 8×1, 4×1, etc.

The coding unit can contain three components of luma Y, chroma Cb, and chroma Cr (or three components of red R, green G, and blue B), or only one of these components. If there are three components, the dimensions of several components can be exactly the same or different, which is related to a picture input format. When the coding unit includes luma, the at least one prediction group may specifically be at least one luma prediction group. When the coding unit includes chroma, the at least one prediction group may specifically be at least one chroma prediction group.

Figure 6:
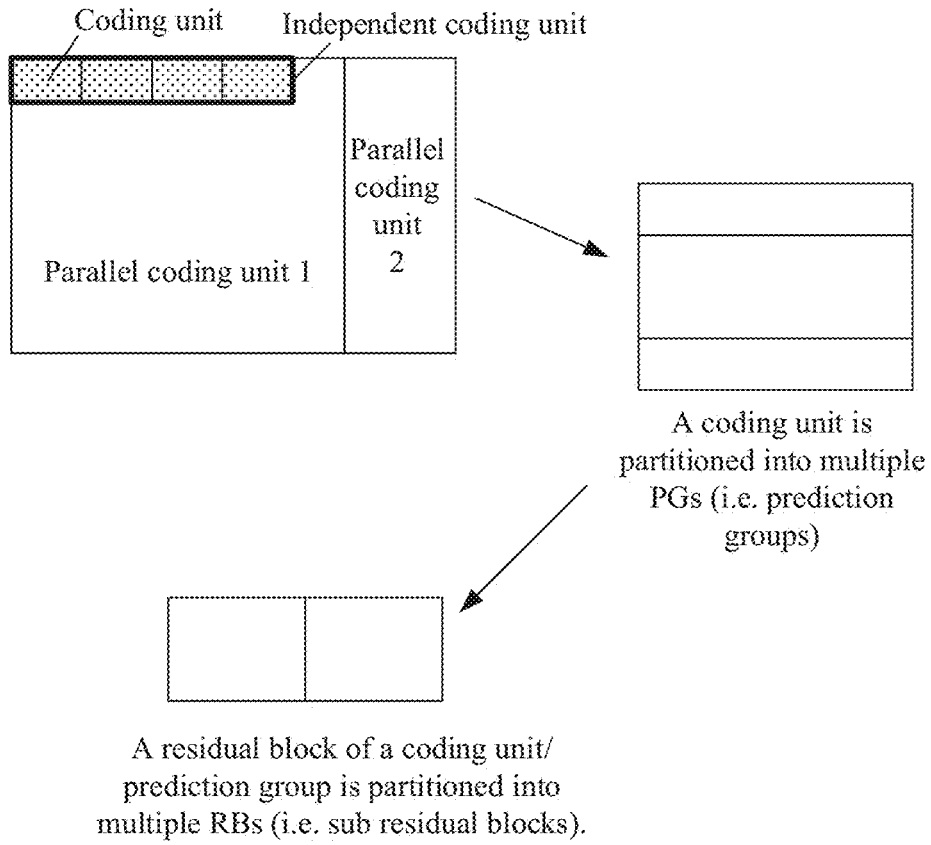
FIG. 6 is a schematic diagram of a corresponding relationship among a picture, a parallel coding unit, an independent coding unit, a coding unit, a prediction group (PG) and a sub residual block (RB) according to an embodiment of the present disclosure.

As shown in FIG. 6, FIG. 6 is a schematic diagram of a corresponding relationship among a picture, a parallel coding unit, an independent coding unit, a coding unit, a prediction group (PG) and a sub residual block (RB). FIG. 6 illustrates an example in which a picture is partitioned into parallel coding unit 1 and parallel coding unit 2 according to 3:1, and an independent coding unit includes four coding units.

It should be noted that the parallel coding unit, the independent coding unit and the coding unit can be replaced by other names, which are not limited by the embodiment of the present disclosure.

It should be noted that in some optional embodiments, parallel coding units can be directly partitioned into one or more coding units.

At step 4: for the coding unit, it can be further partitioned into one or more non-overlapping prediction groups, and each PG codes and decodes according to a selected prediction mode to obtain a prediction value of PG, which constitutes a prediction value of the whole coding unit, and based on the prediction value and the original value of the coding unit, the residual value of the coding unit is obtained.

For the description of the partition mode and prediction mode of the prediction group, please refer to the description elsewhere in the present disclosure, which will not be repeated here.

At step 5: based on the residual value of the coding unit, the coding unit is grouped to obtain one or more non-overlapping residual blocks (RBs), and residual coefficient of each RB is coded and decoded according to the selected mode to form a residual coefficient stream. Specifically, it can be divided into two categories: transforming the residual coefficients and not transforming the residual coefficients.

RB transform: coefficients in RB can be directly coded, or the residual block can be transformed, such as Discrete Cosine Transform (DCT), Discrete Sine Transform (DST), Hadamard transform, etc., and then the transformed coefficients can be coded.

RB partitioning: when RB is small, the coefficients within RB can be uniformly quantified and then binarized for coding, and if the RB is large, it can be further partitioned into multiple coefficient groups (CGs), and each CG can be uniformly quantified and then binarized for coding.

For the part of residual coefficient coding, a feasible method is: semi-fixed length coding. Firstly, a maximum absolute value of residual in an RB block is defined as modified maximum (mm). The number of coded bits of the residual coefficient in the RB block is determined (the number of coded bits of the residual coefficient in the same RB block is the same). For example, if a coding length (CL) of the current RB block is 2 and a current residual coefficient is 1, then coding residual coefficient 1 needs 2 bits, which is expressed as 01. If the CL of the current RB block is 7, it indicates coding 8-bit residual coefficients and 1-bit sign bit. The determination of CL is to find a minimum M value that satisfies that all residuals of a current sub-block are within the range of $[-2^{(M-1)}, 2^{(M-1)}]$. If both $-2^{(M-1)}$ and $2^{(M-1)}$ boundary values are present, M shall be increased by one, i.e., M+1 bits are required to code all the residuals of the current RB block, if only one of $-2^{(M-1)}$ and $2^{(M-1)}$ boundary values is present, a Trailing bit is required to be coded to determine whether the boundary value is $-2^{(M-1)}$ or $2^{(M-1)}$, and if none of the residuals is present in either of the two $-2^{(M-1)}$ or $2^{(M-1)}$, there is no need to code the Trailing bit.

Other residual coefficient coding methods can also be used, such as exponential Golomb coding method, Golomb-Rice coding method, truncated unary code coding method, run-length coding method, direct coding of the original residual value and so on.

In addition, for some special cases, the original value can be directly coded instead of the residual value.

Figure 7:
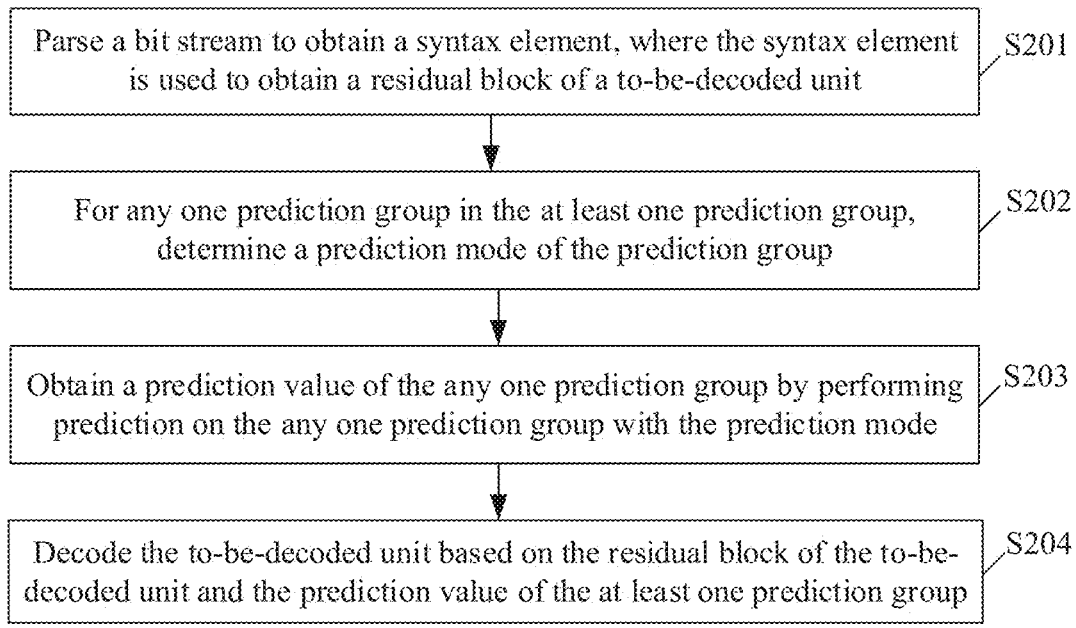
FIG. 7 is a flowchart of a picture decoding method according to an embodiment of the present disclosure.

As shown in FIG. 7, FIG. 7 is a flowchart of a picture decoding method according to an embodiment of the present disclosure. The method can be executed by a decoding side. For example, the decoding side may be the decoder in FIG. 1 or FIG. 3 or the destination device in FIG. 1. The method shown in FIG. 7 includes the following steps.

At step S201: a bit stream is parsed to obtain a syntax element. The syntax element is used to obtain a residual block of a to-be-decoded unit. The to-be-decoded unit includes at least one prediction group.

The to-be-decoded unit in this embodiment may be obtained by coding the coding unit shown in FIG. 5. For the description of a dimension of the to-be-decoded unit, please refer to the above description of the dimension of the to-be-coded unit, and do not repeat it here.

In an example, a width dimension of the to-be-decoded unit is greater than a height dimension of the to-be-decoded unit, and the height dimension is less than or equal to a preset threshold.

The syntax element contains information for obtaining the residual block of the to-be-decoded unit, and the specific information contained in the syntax element is not limited in the present disclosure. For example, the syntax element contains first information obtained after the residual block is transformed, quantized and coefficient coded.

For the coding side, after obtaining the syntax element, the syntax element can be coded to get the bit stream. For the decoding side, entropy decoding is performed on the received bit stream to obtain the syntax element. Subsequently, coefficient decoding, inverse transformation and inverse quantization can be performed on the first information carried in the syntax element, so as to obtain the residual block of the to-be-decoded unit.

In an example, the syntax element is specifically used to obtain at least one residual sub-block partitioned from the residual block of the to-be-decoded unit, so to obtain the residual block. In this case, the syntax element can specifically include: second information obtained by transforming, quantizing and coefficient coding any one residual sub-block of the residual block.

For the coding side, after obtaining the syntax element, the syntax element can be coded to obtain the bit stream. For the decoding side, entropy decoding is performed on the received bit stream to obtain the syntax element. Subsequently, coefficient decoding, inverse transformation, and inverse quantization can be performed on the second information carried in the syntax element to obtain any one residual sub-block.

In an example, the syntax element further includes index information of a grouping manner for the residual block of the to-be-decoded unit, and different index information is used to indicate different grouping manners.

In an example, the syntax element further includes a first indicator to indicate whether to perform grouping on the residual block of the to-be-decoded unit or not.

In an example, the residual block includes a luma residual block or a chroma residual block.

In an implementation, the partition mode used for partitioning the coding unit into prediction groups is predefined by the coding side and decoding side, for example, predefined based on a protocol.

In another implementation, the partition mode used for partitioning the coding unit into prediction groups is indicated to the decoding side by the coding side, for example, the coding side carries the first information in the bit stream and sent it to the decoding side, where the first information is used to characterize the partition mode of the coding unit. A specific content of the first information is not limited in the embodiment of the present disclosure.

It should be noted that a prediction mode corresponding to the partition mode (i.e., the partition mode is associated with the prediction mode) and a prediction mode corresponding to each prediction group in the coding unit (i.e., the coding unit and the partition mode are associated with the prediction mode) are also described below.

At step S202: for any one prediction group in the at least one prediction group, a prediction mode of the prediction group is determined.

In an implementation, the prediction mode corresponding to the partition mode (i.e., the prediction mode is determined with a granularity of the partition mode) or the prediction mode corresponding to each prediction group in the coding unit (i.e., the prediction mode is determined with a granularity of the prediction group in the coding unit) is predefined by the coding side and the decoding side, for example, predefined based on a protocol.

In another implementation, the prediction mode corresponding to the partition mode, or the prediction mode corresponding to each prediction group in the coding unit, is indicated by the coding side to the decoding side, for example, the coding side carries second information in the bit stream and sent it to the decoding side, where the second information is used to characterize the prediction mode corresponding to each prediction group in the coding unit, and a specific content of the second information is not limited in the embodiment of the present disclosure.

In an example, both the partition mode of the prediction group and the prediction mode of the prediction group can refer to the relevant description in the embodiment of the coding side in the present disclosure, and will not be repeated here.

At step S203: a prediction value of the any one prediction group is obtained by performing prediction for the any one prediction group with the prediction mode.

For example, for each prediction group, an original value of the prediction group (i.e., the original value of the prediction group obtained by the decoding side) is obtained based on a residual value of the prediction group and a prediction value of the prediction group. It can be understood that there may be differences between the original value of the prediction group obtained by the coding side and the original value of the prediction group obtained by the decoding side.

At step S204: the to-be-decoded unit is decoded based on the residual block of the to-be-decoded unit and the prediction value of the at least one prediction group.

For example, based on the residual block of the to-be-decoded unit and the prediction value of the any one prediction group, reconstruction is performed. Subsequent operations may further include filtering the reconstructed block to obtain a decoded picture block.

According to the picture decoding method provided by the embodiment of the present disclosure, the to-be-decoded unit is partitioned into at least one prediction group, and the prediction group is predicted according to a prediction mode corresponding to the prediction group. In this way, compared to the technical solution of performing prediction directly for the to-be-decoded unit itself, it helps to realize flexible prediction for the to-be-decoded unit, for example, by reasonably setting the partition mode, it helps to realize performing prediction for a plurality of prediction groups in parallel, as well as setting different prediction modes for different prediction groups, etc., so as to improve the prediction efficiency, and thereby improving the decoding efficiency.

Hereinafter, the partition modes provided by the embodiment of the present disclosure will be described.

It can be understood that since the to-be-decoded unit in the above is obtained by coding the coding unit, a corresponding relationship between the coding unit and the prediction group is the same as that between the to-be-decoded unit and the prediction group. For simplicity of description, only the corresponding relationship between coding unit and prediction group is described below, that is, from the perspective of coding unit or coding side, the partition mode is described. The corresponding relationship between the to-be-decoded unit and the prediction group can be inferred based on the content described below, which is not repeated in the present disclosure.

First Type of Partition Manner

In the first part, for a first coding unit in an independent coding unit, the present disclosure provides the following partition modes.

It should be noted that if an independent coding unit is partitioned into one coding unit, the first coding unit in the independent coding unit is the independent coding unit itself. If an independent coding unit is partitioned into a plurality of non-overlapping coding units, the first coding unit is a coding unit containing "a pixel in a first row and a first column in the independent coding unit" in the independent coding unit.

It can be understood that when predicting a pixel value of a first pixel (i.e., a pixel in the first row and the first column) in the coding unit targeted by the first part, it is usually impossible to refer to other pixels. In an example, the pixel value of the first pixel is coded as an original value or the pixel value of the first pixel can also be coded as other values (such as a difference between the original value and a preset value), which is not limited by this embodiment. Prediction values of other pixels except the first pixel can be predicted according to a method provided by the embodiment of the present disclosure. Therefore, none of the partition mode in the first part partitions this pixel into any prediction group.

Partition mode A: the coding unit includes a first prediction group, a second prediction group and a third prediction group.

The first prediction group includes pixels other than the first pixel in a first row of the coding unit. The second prediction group includes consecutive odd columns of pixels in a non-first row pixels (i.e. a pixel in the non-first row) of the coding unit. The third prediction group includes consecutive even columns of pixels in a non-first row pixels of the coding unit.

In an example, the number of pixels contained in a second prediction group is less than or equal to a certain threshold, or the number of pixel columns contained in a second prediction group is less than or equal to a certain threshold. In an example, the number of pixels contained in a third prediction group is less than or equal to a certain threshold, or the number of pixel columns contained in a third prediction group is less than or equal to a certain threshold.

In an example, the coding unit includes a first prediction group, at least one second prediction group and at least one third prediction group.

In the embodiment of the present disclosure, the prediction mode corresponding to each prediction group is not limited. For example, the prediction mode corresponding to the first prediction group includes horizontal prediction. For example, the prediction mode corresponding to the second prediction group includes vertical prediction. For example, a prediction mode corresponding to a non-last column pixel (i.e. a pixel in the non-last column) in the third prediction group includes horizontal mean prediction, and the prediction mode corresponding to a last column pixel (i.e. a pixel in the last column) in the third prediction group includes horizontal prediction.

In an example, for the last column of pixels in the third prediction group, since pixel values of pixels on a right side of the column have not been obtained when the prediction operation is performed, and the horizontal mean prediction needs to refer to pixel values of the pixels on left and right sides of the column, therefore, the prediction mode corresponding to the last column of pixels usually does not adopt horizontal mean prediction, and in an example, horizontal prediction can be adopted.

Partition mode B: the coding unit includes a first prediction group, a second prediction group and a third prediction group.

The first prediction group includes pixels other than the first pixel in a first column of the coding unit. The second prediction group includes odd row elements in a non-first column pixels of the coding unit. The third prediction group includes even row elements in a non-first column pixels of the coding unit.

A second prediction group includes an odd row element or consecutive odd rows of elements in the non-first column pixels of the coding unit. A third prediction group includes an even row element or consecutive even rows of elements in the non-first column pixels of the coding unit.

The coding unit may include one first prediction group, at least one second prediction group and at least one third prediction group.

The embodiment of the present disclosure does not limit the prediction mode corresponding to each prediction group. For example, the prediction mode corresponding to the first prediction group includes vertical prediction. For example, the prediction mode corresponding to the second prediction group includes horizontal prediction. For example, if a prediction mode corresponding to a last even row element in the third prediction group includes vertical mean prediction, a prediction mode corresponding to a non-last even row element in the third prediction group includes vertical prediction.

Partition mode C: the coding unit includes a first prediction group and a second prediction group. The first prediction group includes pixels other than the first pixel in a first column of the coding unit. The second prediction group is a row of pixels in a non-first column pixels of the coding unit.

In an example, the coding unit includes a first prediction group and at least one second prediction group.

In the embodiment of the present disclosure, the prediction mode corresponding to each prediction group is not limited. In an example, the prediction mode corresponding to the first prediction group includes vertical prediction. In an example, the prediction mode corresponding to the second prediction group includes horizontal prediction.

Partition mode D: the coding unit includes a first prediction group and a second prediction group.

The first prediction group includes pixels other than the first pixel of first row of the coding unit. The second prediction group is consecutive column of pixels in a non-first row pixels of the coding unit.

In an example, the number of pixels contained in a second prediction group is less than or equal to a certain threshold, or the number of pixel columns contained in a second prediction group is less than or equal to a certain threshold.

In an example, the coding unit includes a first prediction group and at least one second prediction group.

In the embodiment of the present disclosure, the prediction mode corresponding to each prediction group is not limited. In an example, the prediction mode corresponding to the first prediction group includes horizontal prediction. In an example, the prediction mode corresponding to the second prediction group includes vertical prediction.

In the second part, for a non-first coding unit in the independent coding unit, a first pixel of the coding unit can refer to pixels in other coding units in the independent coding unit when performing prediction. Based on this, in an example, a partition mode provided by the present disclosure is different from the partition modes described in the first part above in that the first prediction group in the above partition modes A-D further includes the first pixel in the coding unit.

In an implementation, a prediction mode corresponding to any partition mode of the second part can refer to a corresponding partition mode of the first part.

For example, a partition mode A' of the second part, which corresponds to the above-mentioned partition mode A, may be that the coding unit includes a first prediction group, a second prediction group and a third prediction group. The first prediction group includes a first row of pixels of the coding unit. The second prediction group includes consecutive odd columns of pixels in a non-first row pixels of the coding unit. The third prediction group includes consecutive even columns of pixels in a non-first row pixels of the coding unit.

In the embodiment of the present disclosure, the prediction mode corresponding to each prediction group is not limited. For example, the prediction mode corresponding to the first prediction group includes horizontal prediction. For example, the prediction mode corresponding to the second prediction group includes vertical prediction. For example, the prediction mode corresponding to a non-last column pixel in the third prediction group includes horizontal mean prediction, and the prediction mode corresponding to a last column pixel in the third prediction group includes horizontal prediction.

For another example, a partition mode D' of the second part, which corresponds to the above-mentioned partition mode D, may be that the coding unit includes a first prediction group and a second prediction group. The first prediction group includes a first row of pixels of the coding unit. The second prediction group is consecutive columns of pixels in a non-first row pixels of the coding unit.

In the embodiment of the present disclosure, the prediction mode corresponding to each prediction group is not limited. In an example, the prediction mode corresponding to the first prediction group includes horizontal prediction. In an example, the prediction mode corresponding to the second prediction group includes vertical prediction.

The explanation of the relevant content in partition mode A' can refer to the relevant description in partition mode A mentioned above. The explanation of the relevant content in partition mode D' can refer to the relevant description in partition mode D mentioned above.

In another implementation, the prediction mode corresponding to any partition mode in the second part can correspond to other partition modes.

For example, a partition mode B' of the second part, which corresponds to the above-mentioned partition mode B, may be that the coding unit includes a first prediction group, a second prediction group and a third prediction group. The first prediction group includes a first column of pixels of the coding unit. The second prediction group includes odd row elements in a non-first column pixels of the coding unit. The third prediction group includes even row elements in a non-first column pixels of the coding unit.

The embodiment of the present disclosure does not limit the prediction mode corresponding to each prediction group. For example, the prediction mode corresponding to the first prediction group includes horizontal prediction. For example, the prediction mode corresponding to the second prediction group includes horizontal prediction. For example, a prediction mode corresponding to a last even row element in the third prediction group includes vertical mean prediction, and a prediction mode corresponding to a non-last even row element in the third prediction group includes vertical prediction.

For another example, a partition mode C' of the second part, which corresponds to the above-mentioned partition mode C, may be that the coding unit includes a first prediction group and a second prediction group. The first prediction group includes a first column of pixels of the coding unit. The second prediction group is a row of pixels in a non-first column pixels of the coding unit.

In the embodiment of the present disclosure, the prediction mode corresponding to each prediction group is not limited. In an example, the prediction mode corresponding to the first prediction group includes horizontal prediction. In an example, the prediction mode corresponding to the second prediction group includes horizontal prediction.

In an example, the above-mentioned first type of partition manner can be applied to any one of 16*4 coding unit, 16*2 coding unit and 8*2 coding unit. It can also be applied to a coding unit of other sizes.

Second Type of Partition Manner

A coding unit is partitioned into a prediction group. In other words, the coding unit is not partitioned. In an example, the number of pixels contained in the coding unit is less than or equal to a preset threshold. For example, a size of the coding unit is 8*2.

In the first part, for a first coding unit in an independent coding unit:

In an implementation, prediction modes corresponding to other pixels except a first pixel in a first row of the coding unit include horizontal prediction, and prediction modes corresponding to non-first row pixels include vertical prediction.

In another implementation, prediction modes corresponding to other pixels except a first pixel in a first column of the coding unit include vertical prediction, and prediction modes corresponding to non-first column pixels include horizontal prediction.

In the second part, for a non-first coding unit in an independent coding unit:

In an implementation, prediction modes corresponding to a first row of pixels of the coding unit include horizontal prediction, and prediction modes corresponding to non-first row pixels include vertical prediction.

In another implementation, prediction modes corresponding to all pixels of the coding unit include horizontal prediction.

Third Type of Partition Manner

Partition mode 1: the coding unit includes a first prediction group and a second prediction group. The first prediction group includes odd columns of pixels. The second prediction group includes even columns of pixels.

The embodiment of the present disclosure does not limit the prediction mode corresponding to each prediction group. For example, the prediction mode corresponding to the first prediction group includes vertical prediction. A prediction mode corresponding to a non-last column pixel in the second prediction group includes horizontal mean prediction, and a prediction mode corresponding to a last column pixel includes horizontal prediction mode.

Partition mode 2: the coding unit includes a first prediction group and a second prediction group. The first prediction group includes even rows of pixels. The second prediction group includes odd columns of pixels.

The embodiment of the present disclosure does not limit the prediction mode corresponding to each prediction group. For example, the prediction mode corresponding to the first prediction group includes horizontal prediction. The prediction mode corresponding to the second prediction group includes vertical mean prediction.

Partition mode 3: the coding unit includes a plurality of prediction groups, and each prediction group includes a row of pixels in the coding unit. The embodiment of the present disclosure does not limit the prediction mode corresponding to each prediction group. For example, a prediction mode corresponding to any one or more prediction groups (such as each prediction group) includes horizontal prediction.

Partition mode 4: the coding unit includes a plurality of prediction groups, and each prediction group includes consecutive columns of pixels. In an example, different prediction groups contain the same number of pixel columns. The embodiment of the present disclosure does not limit the prediction mode corresponding to each prediction group. For example, the prediction mode corresponding to any one or more prediction groups includes vertical prediction.

In an example, the above-mentioned first type of partition can be applied to any one of 16*4 coding unit, 16*2 coding unit and 8*2 coding unit. It can also be applied to a coding unit of other sizes.

In an example, for a first row of a parallel coding unit (including a first coding unit of each parallel coding unit), the above-mentioned partition mode 3 can be adopted, or only the above-mentioned partition mode 3 is allowed. For the first column, the above-mentioned partition mode 1 or 4 can be adopted. The first row is a first row coding unit of parallel coding unit, and the first column is a first column coding unit of parallel coding unit.

In an example, a coding unit may refer to a column of pixels on the left side and a row of pixels on the upper side of the coding unit.

Fourth Type of Partition Manner

A coding unit is partitioned into a prediction group. In other words, the coding unit is not partitioned. In an example, the number of pixels contained in the coding unit is less than or equal to a preset threshold. For example, a size of the coding unit is 8*1.

The follow provides several prediction modes in an example: prediction mode 1, and a prediction mode corresponding to a pixel of the coding unit include vertical prediction. For example, all pixels in the coding unit adopt vertical prediction.

Prediction mode 2: a prediction mode corresponding to a pixel of the coding unit includes horizontal prediction. For example, all pixels in the coding unit adopt horizontal prediction.

In an example, for a first row of a parallel coding unit (including a first coding unit of each parallel coding unit), the above-mentioned prediction mode 2 can be adopted, or only the above-mentioned prediction mode 2 is allowed. For the first column, the above-mentioned prediction mode 1 can be adopted, or only the above-mentioned prediction mode 1 is allowed. The first row is a first row coding unit of parallel coding unit, and the first column is a first column coding unit of parallel coding unit.

In an example, for any coding unit of a parallel coding unit (e.g., each coding unit) can refer to a column of pixels on the left and a row of pixels on the upper side of the coding unit.

Fifth Type of Partition Manner

Partition mode E: a coding unit is partitioned into multiple prediction groups in a vertical equal partition manner. For example, a row of coding units is partitioned into a prediction group. For example, vertically partitioned into 2 or 4 prediction groups.

In an example, if the coding unit is a first coding unit in an independent coding unit, a first pixel in the coding unit may not be partitioned into any prediction group, that is, one of the prediction groups contains other pixels except a first element in a first row of the coding unit.

Partition mode F: a coding unit is partitioned into multiple prediction groups in a horizontal equal partition manner. For example, consecutive columns of coding units are partitioned into one prediction group. For example, horizontally partitioned into 2, 4 or 8 prediction groups.

In an example, if the coding unit is a first coding unit in an independent coding unit, a first pixel in the coding unit may not be partitioned into any prediction group, that is, one of the prediction groups contains other pixels except a first element in a first column of the coding unit, and a column of pixels or consecutive columns of pixels starting from the first column.

Partition mode G: a coding unit is partitioned into multiple prediction groups along a vertical direction according to a preset proportion.

A specific value of the preset proportion is not limited in the embodiment of the present disclosure. In an example, it is partitioned into three prediction groups in a way of 1:2:1 or 2:1:1 or 1:1:2.

In an example, if the coding unit is a first coding unit in an independent coding unit, a first pixel in the coding unit may not be partitioned into any prediction group, that is, one of the prediction groups contains other pixels except a first element in a first row of the coding unit, or contains other pixels except the first element in a first row of the coding unit and a row of pixels or consecutive rows of pixels starting from the first row.

Partition mode H: a coding unit is partitioned into multiple prediction groups along a horizontal direction according to a preset proportion.

A specific value of the preset proportion is not limited in the embodiment of the present disclosure. In an example, it is partitioned into three prediction groups in a way of 1:2:1 or 2:1:1 or 1:1:2.

In an example, if the coding unit is a first coding unit in an independent coding unit, a first pixel in the coding unit may not be partitioned into any prediction group, that is, one of the prediction groups contains other pixels except a first element in a first column of the coding unit, or contains other pixels except the first element in a first column of the coding unit and a column of pixels or consecutive columns of pixels starting from the first column.

The embodiment of the present disclosure does not limit the prediction mode corresponding to any one of the above-mentioned partition modes E-H.

In an example, the above-mentioned first type of partition can be applied to any one of 16*4 coding unit, 16*2 coding unit and 8*2 coding unit. It can also be applied to a coding unit of other sizes.

The partition modes provided above are illustratively explained below through specific examples. In some embodiments, the prediction mode corresponding to the partition mode is further illustrated.

Embodiment 1: For 16*4 Coding Unit 1.1 for the Case that the Independent Coding Unit has Only One 16*4 Coding Unit.

Figure 8:
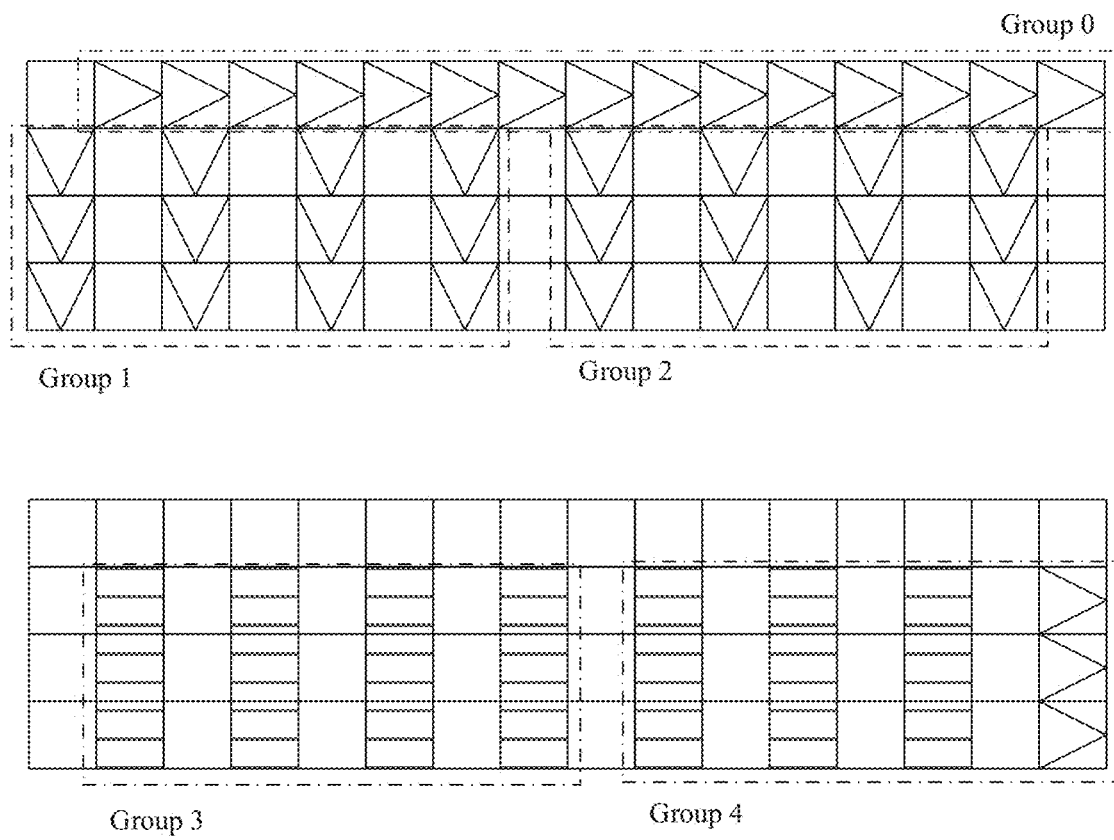
FIGS. 8-15 are schematic diagrams of partitioning modes and prediction modes of a 16*4 coding unit according to an embodiment of the present disclosure.

Example 1: As shown in FIG. 8, the coding unit includes five prediction groups, namely Groups 0-4.

Group 0 consists of pixels in row 1, columns 2-16 and uses horizontal prediction.

Group 1 consists of pixels in rows 2, 3 and 4, columns 1, 3, 5 and 7, and uses vertical prediction.

Group 2 consists of pixels in rows 2, 3 and 4, columns 9, 11, 13 and 15, and uses vertical prediction.

Group 3 consists of pixels in rows 2, 3 and 4, columns 2, 4, 6 and 8, and uses horizontal prediction.

Group 4 consists of pixels in rows 2, 3 and 4, columns 10, 12, 14 and 16, with horizontal mean prediction used for the pixels in columns 10, 12 and 14, and horizontal prediction used for pixels in column 16.

Figure 9:
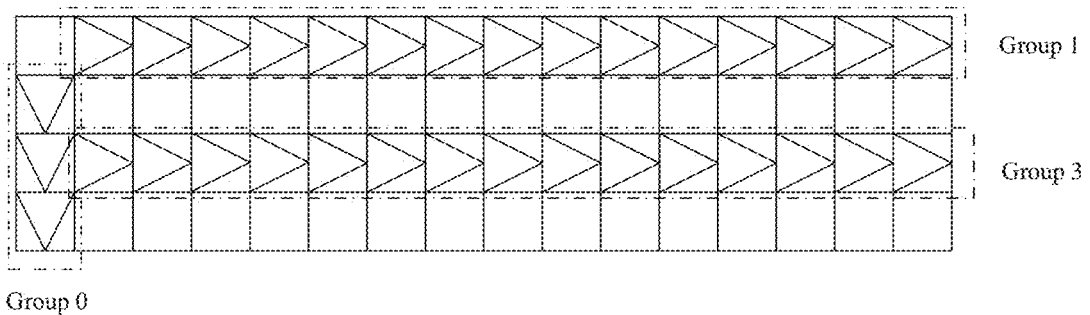
Figure 9:
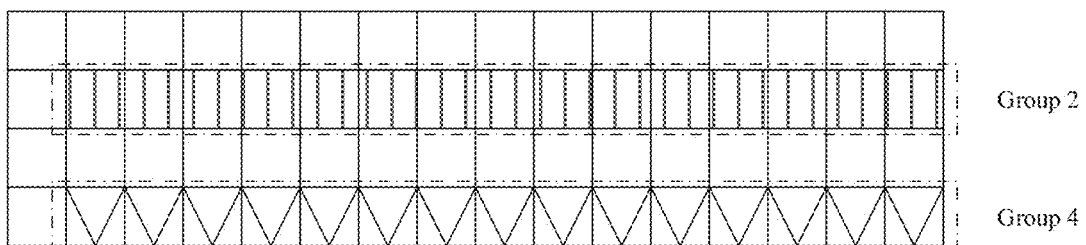

Example 2: As shown in FIG. 9, the coding unit includes five prediction groups, namely Groups 0-4.

Group 0 consists of pixels in column 1 except a first pixel, and uses vertical prediction.

Group 1 consists of pixels in row 1, columns 2-16 and uses horizontal prediction.

Group 3 consists of pixels in row 3, columns 2-16 and uses horizontal prediction.

Group 2 consists of pixels in row 2, columns 2-16 and uses vertical mean prediction.

Group 4 consists of pixels in row 4, columns 2-16 and uses vertical prediction.

Figure 10:
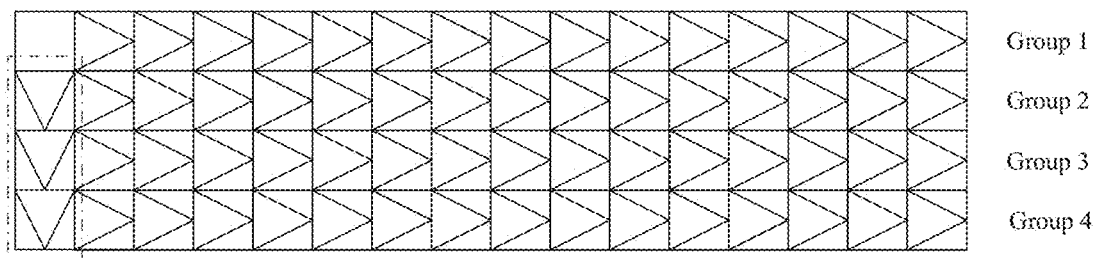

Example 3: As shown in FIG. 10, the coding unit includes five prediction groups, namely Groups 0-4.

Group 0 consists of pixels in rows 2-4 and column 1, and uses vertical prediction.

Group 1 consists of pixels in row 1, columns 2-16 and uses horizontal prediction.

Group 2 consists of pixels in row 2, columns 2-16 and uses horizontal prediction.

Group 3 consists of pixels in row 3, columns 2-16 and uses horizontal prediction.

Group 4 consists of pixels in row 4, columns 2-16 and uses horizontal prediction.

Figure 11:
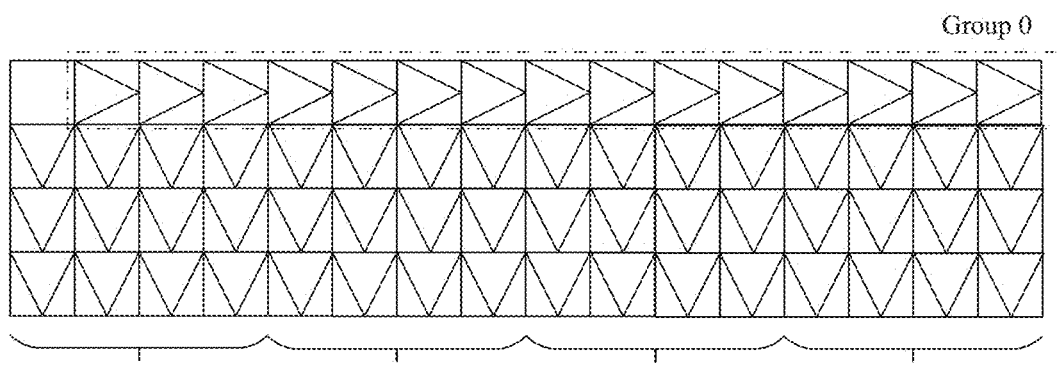
Figure 12:
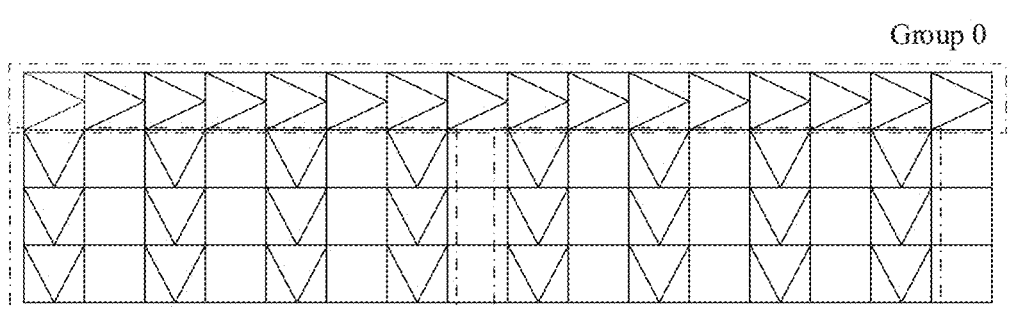
Figure 12:
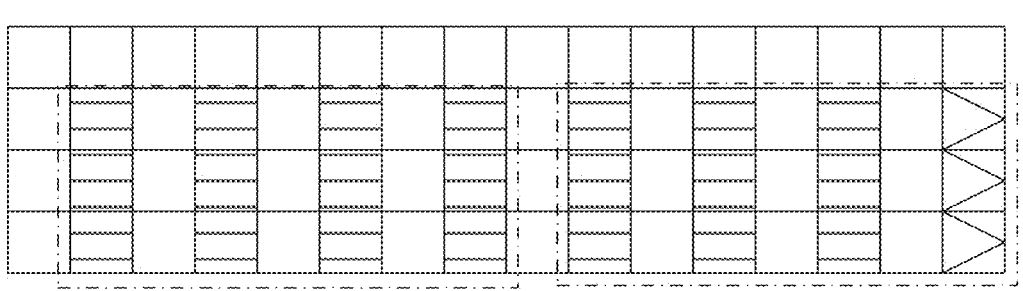
Figure 13:
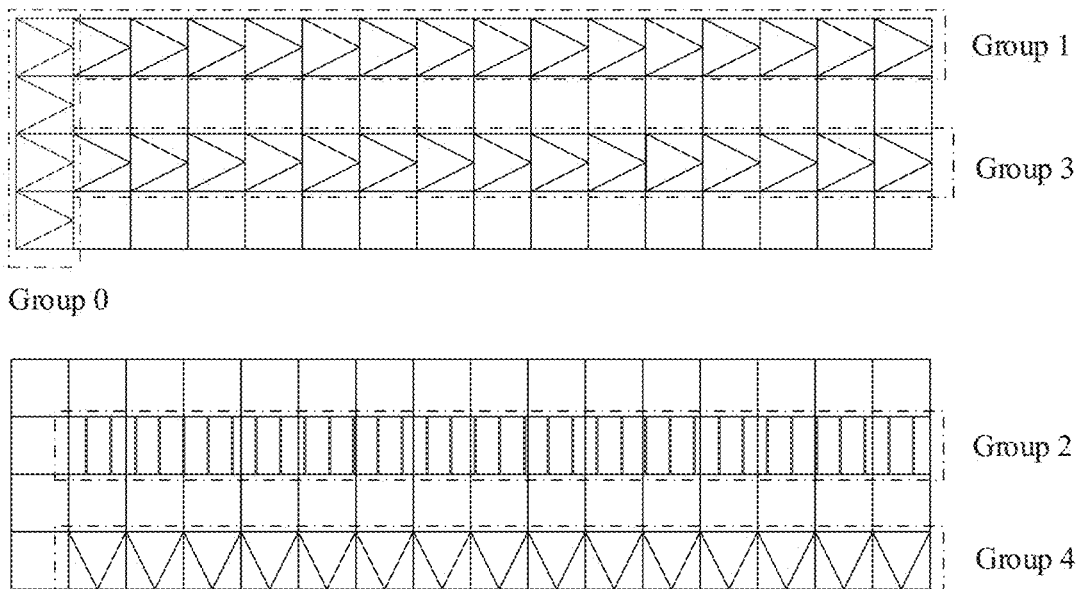
Figure 14:
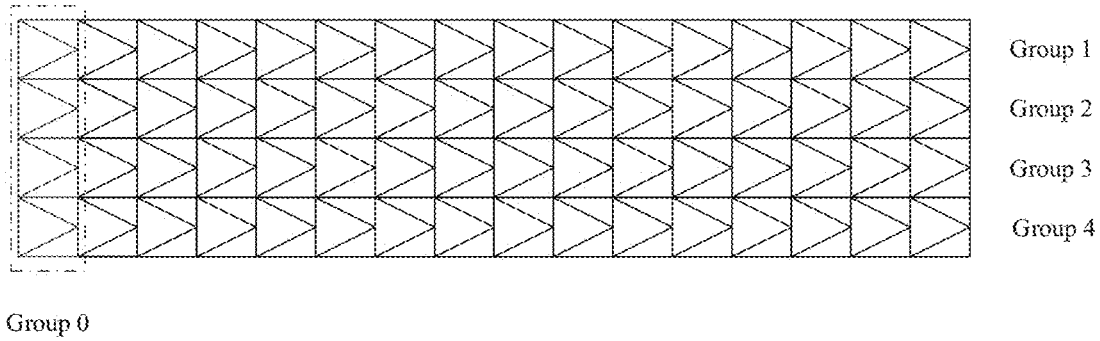
Figure 15:
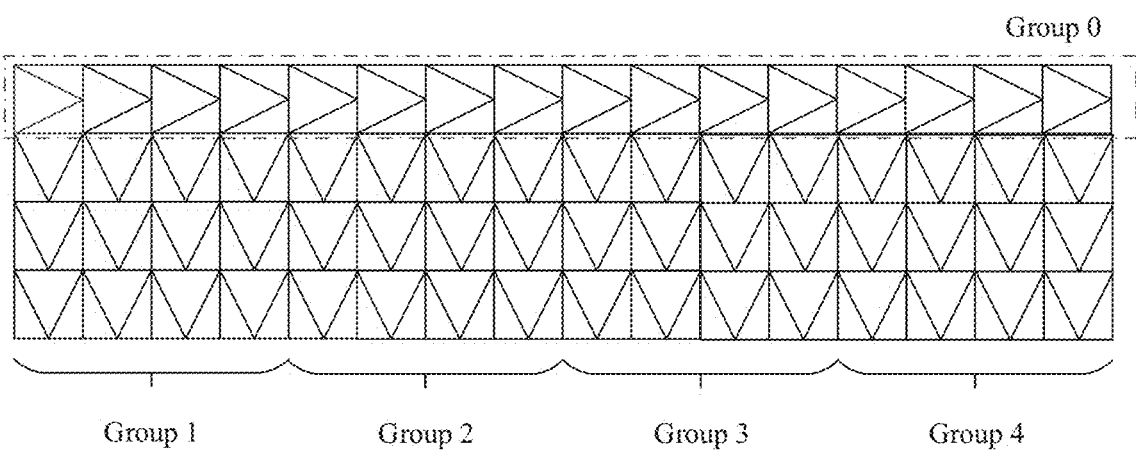

Example 4: As shown in FIG. 11, the coding unit includes five prediction groups, namely Groups 0-4.

Group 0 consists of pixels in row 1, columns 2-16 and uses horizontal prediction.

Group 1 consists of pixels in rows 2, 3 and 4, columns 1-4, and uses vertical prediction.

Group 2 consists of pixels in rows 2, 3 and 4, columns 5-8, and uses vertical prediction.

Group 3 consists of pixels in rows 2, 3 and 4, columns 9-12, and uses vertical prediction.

Group 4 consists of pixels in rows 2, 3 and 4, columns 13-16, and uses vertical prediction.

The above description takes the coding unit with the size of 16*4 as an example, and coding units with other sizes can also be partitioned according to the same principle. For a coding unit with a size of 16*2, Groups 1~4 in the above example 1 are 4 pixels, there are no Groups 2 and 3 in the above example 2 (i.e., there are only 3 groups in total of Groups 0, 1 and 4), there are no Groups 2 and 3 in the above example 3, and Groups 1~4 in the above example 4 are 4 pixels.

1.2 for the Case that the Independent Coding Unit has Multiple 16*4 Coding Units.

For the case that an independent coding unit contains multiple 16*4 coding units, a partition mode of a first 16*4 coding unit is shown in 1.1 above. The partition mode of the subsequent 16*4 coding units is shown in FIG. 12-FIG. 15.

For example, a difference between a partition mode of the subsequent 16*4 coding unit and the first 16*4 coding unit is in the processing of the first pixel, and a difference in a prediction mode is in the processing of the first column of pixels, and prediction values of other pixels can be consistent with the processing of the first 16×4 block. Specifically: for the partition mode A or D: the prediction mode corresponding to the first pixel in the first column of the subsequent 16*4 coding unit includes horizontal prediction, and the prediction mode corresponding to other pixels in the first column includes vertical prediction.

For partition mode B or C: the prediction mode corresponding to four pixels in the first column of the subsequent 16*4 coding unit includes horizontal prediction.

In an example, a 16*4 coding unit in Embodiment 1 may be a 16*4 luma block or a 16*4 chroma block.

In an example, Embodiment 1 can also be applied to coding units of other sizes.

Embodiment 2: For 8*2 Coding Unit 2.1 for the Case that the Independent Coding Unit has Only One 8*2 Coding Unit.

Figure 16:
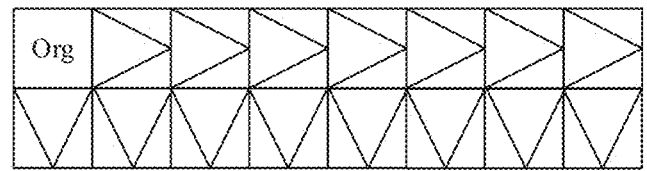
FIGS. 16-19 are schematic diagrams of partitioning modes and prediction modes of an 8*2 coding unit according to an embodiment of the present disclosure.

As shown in FIG. 16, horizontal prediction is performed on remaining seven pixels except a first pixel in a first row, and vertical prediction is performed on eight pixels in a second row.

Figure 17:
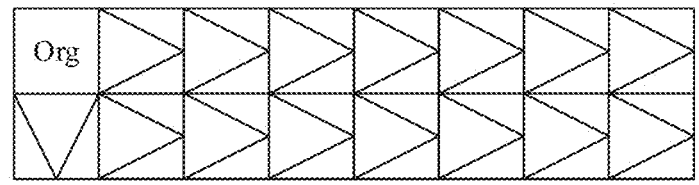

As shown in FIG. 17, horizontal prediction is performed on remaining seven pixels except a first pixel in a first row, vertical prediction is performed on a first pixel in a second row, and horizontal prediction is performed on remaining seven pixels in the second row.

2.2 for the Case that the Independent Coding Unit has Multiple 8*2 Coding Units

For a first 8*2 coding unit in an independent coding unit (e.g., N*2 independent coding unit with N greater than or equal to 16), a prediction process can be consistent with the prediction process described in 2.1.

For other 8*2 coding units in the independent coding unit (e.g., N*2 independent coding unit with N greater than or equal to 16), except for a first column, a prediction process of remaining pixels can be consistent with that of the first 8*2 coding unit.

Figure 18:
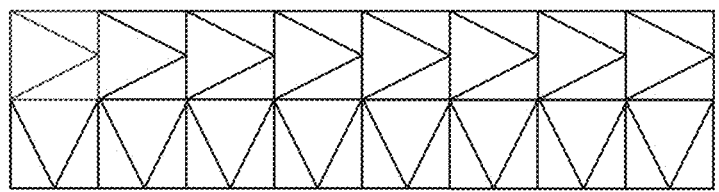

As shown in FIG. 18, a first pixel in a first column adopts horizontal prediction, and a remaining pixel in the first column adopts vertical prediction.

Figure 19:
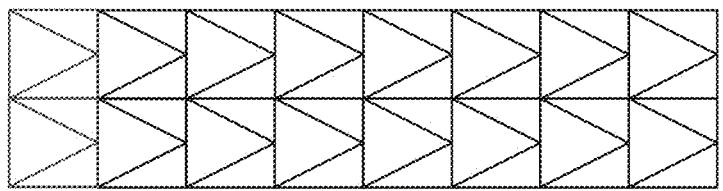

As shown in FIG. 19, two pixels in a first row adopt horizontal prediction.

In an example, an 8*2 coding unit in Embodiment 2 may be an 8*2 luma block or an 8*2 chroma block.

In an example, Embodiment 2 can also be applied to coding units of other sizes.

Embodiment 3: For 16*2 Coding Unit

In an example, for a first row coding unit of a parallel coding unit (including a first 16*2 coding unit of each parallel coding unit), only the following Example 3 is allowed for partition and prediction. For a first column coding unit, only the following Example 1 or Example 4 is allowed for partition and prediction.

In an example, each 16*2 coding unit can refer to pixel values of one column of pixels (2 pixels) on a left side and one row of pixels (16 pixels) on an upper side.

Figure 20:
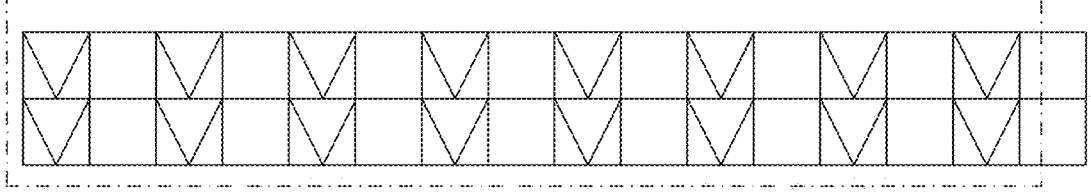
FIGS. 20-23 are schematic diagrams of partitioning modes and prediction modes of a 16*2 coding unit according to an embodiment of the present disclosure.
Figure 20:
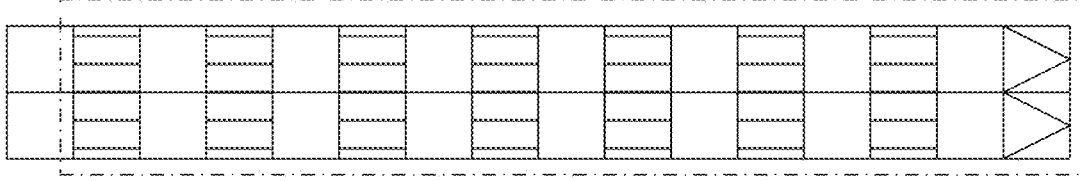

Example 1: As shown in FIG. 20, a coding unit includes Groups 1-2.

Group 1 consists of pixels in columns 1, 3, 5, 7, 9, 11, 13 and 15, and uses vertical prediction. In an example, pixels of Group 1 can refer to a last row of pixels on the upper side of the coding unit and neighbouring to the coding unit.

Group 2 consists of pixels in columns 2, 4, 6, 8, 10, 10, 14 and 16, and other pixels except pixels in column 16 adopt horizontal mean prediction, and elements in column 16 adopts horizontal prediction.

Figure 21:
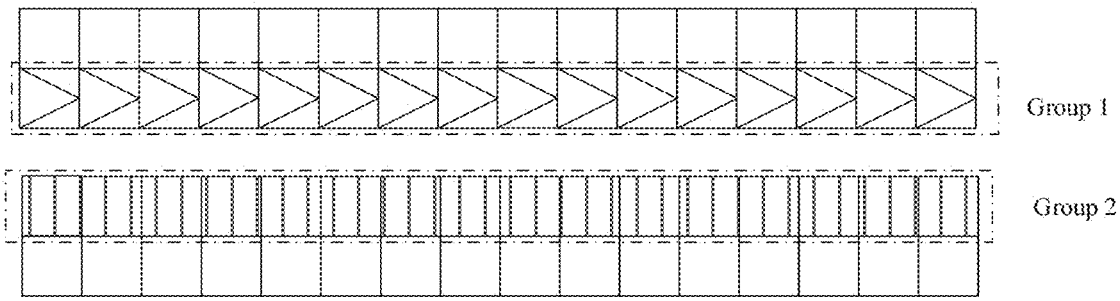

Example 2: As shown in FIG. 21, a coding unit includes Groups 1-2.

Group 1 consists of pixels in row 2, and uses horizontal prediction.

Group 2 consists of pixels in row 1, and uses vertical mean prediction. In an example, pixels of Group 2 can refer to a last row of pixels on the upper side of the coding unit and neighbouring to the coding unit.

Figure 22:
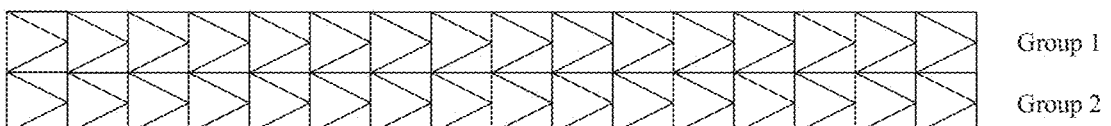

Example 3: As shown in FIG. 22, a coding unit includes Groups 1-2.

Group 1 consists of pixels in row 1, and uses horizontal prediction.

Group 2 consists of pixels in row 2, and uses horizontal prediction.

Figure 23:
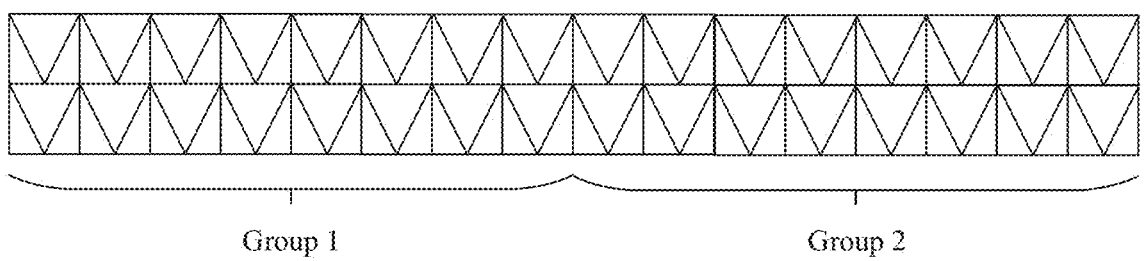

Example 4: As shown in FIG. 23, a coding unit includes Groups 1-2.

Group 1 consists of pixels in columns 1-8 and uses vertical prediction.

Group 2 consists of pixels in columns 9-16 and uses vertical prediction.

In an example, the pixels of Group 1 and Group 2 can refer to a last row of pixels of a 16*2 coding unit on an upper side of the coding unit and neighbouring to the coding unit.

In an example, a 16*2 coding unit in Embodiment 3 may be a 16*2 luma block or a 16*2 chroma block.

In an example, Embodiment 3 can also be applied to coding units of other sizes, such as 16*4 or 8*2 coding units.

Embodiment 4: For 8*1 Coding Unit

In an example, a first row coding unit of each parallel coding unit (including a first 8*1 coding unit of each parallel coding unit), only the following Example 2 is allowed for prediction, and a first column coding unit is only allowed to use the following Example 1 for prediction.

In an example, each 8*1 coding unit can refer to values of one column of pixels (1 pixel) on a left side and one row of pixels (8 pixels) on an upper side.

An 8*1 coding unit contains only one Group.

Figure 24:
FIGS. 24-25 are schematic diagrams of partitioning modes and prediction modes of an 8*1 coding unit according to an embodiment of the present disclosure.

Example 1: As shown in FIG. 24, vertical prediction is performed on each pixel in the coding unit.

Figure 25:
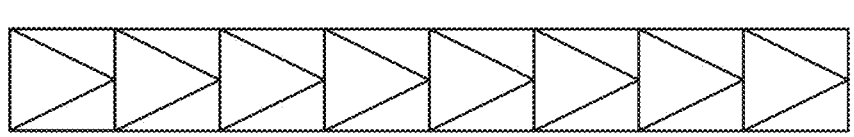

Example 2: As shown in FIG. 25, horizontal prediction is performed on each pixel in the coding unit.

Embodiment 5

Figure 26:
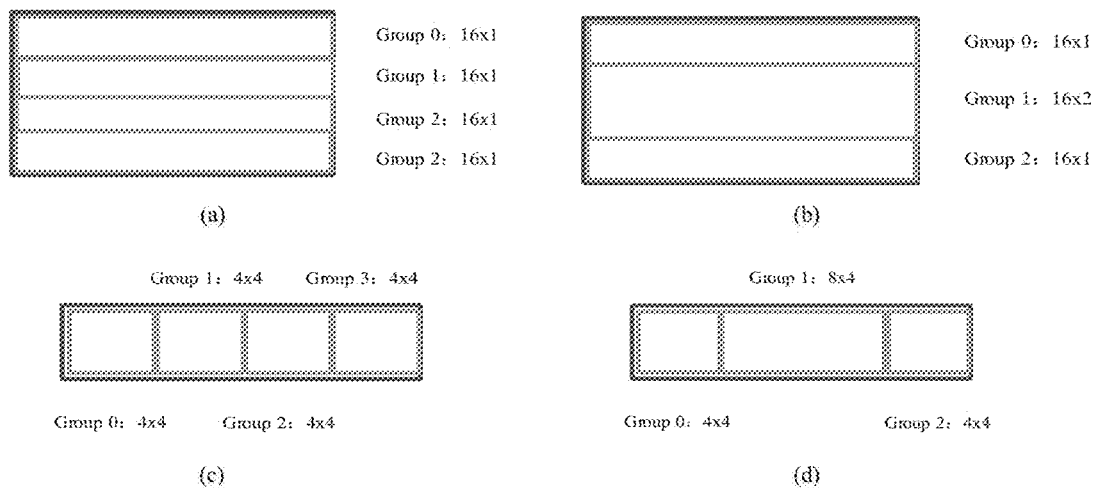
FIGS. 26-28 are schematic diagrams of other partitioning modes according to an embodiment of the present disclosure.

FIG. 26 provides several partition modes of a 16*4 coding unit. (a) schematically shows that the coding unit is vertically and equally partitioned into four Groups. (b) schematically shows that the coding unit is vertically partitioned into three Groups in a ratio of 1:2:1. (c) schematically shows that the coding unit is horizontally and equally partitioned into four Groups. (d) schematically shows that the coding unit is horizontally partitioned into three Groups in a ratio of 1:2:1. FIG. 26 further illustrates the size of each Group.

Figure 27:
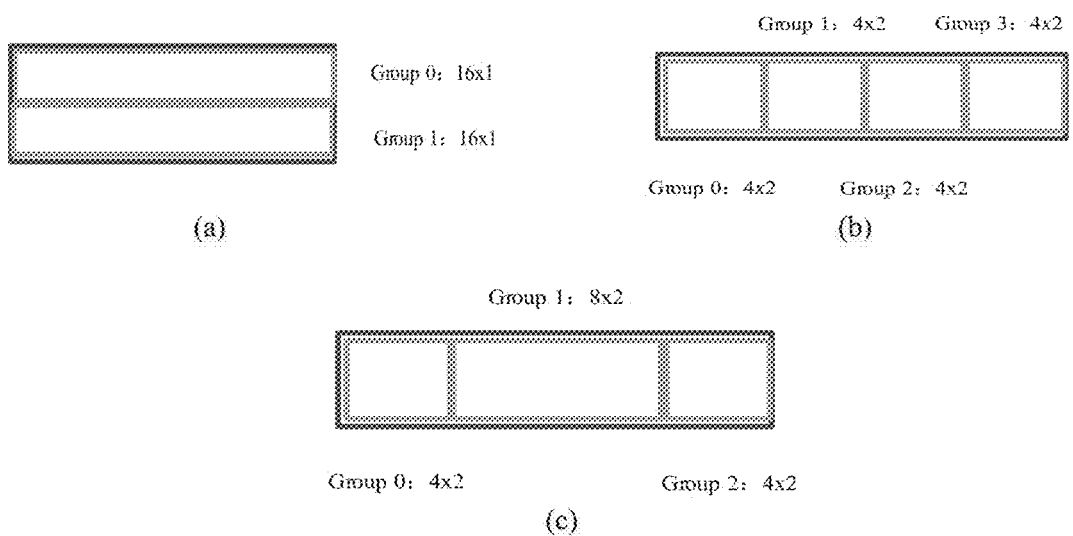

FIG. 27 provides several partition modes of a 16*2 coding unit. (a) schematically shows that the coding unit is vertically and equally partitioned into two Groups. (b) schematically shows that the coding unit is horizontally and equally partitioned into four Groups. (c) schematically shows that the coding unit is horizontally partitioned into three Groups in a ratio of 1:2:1. FIG. 27 further illustrates the size of each Group.

Figure 28:
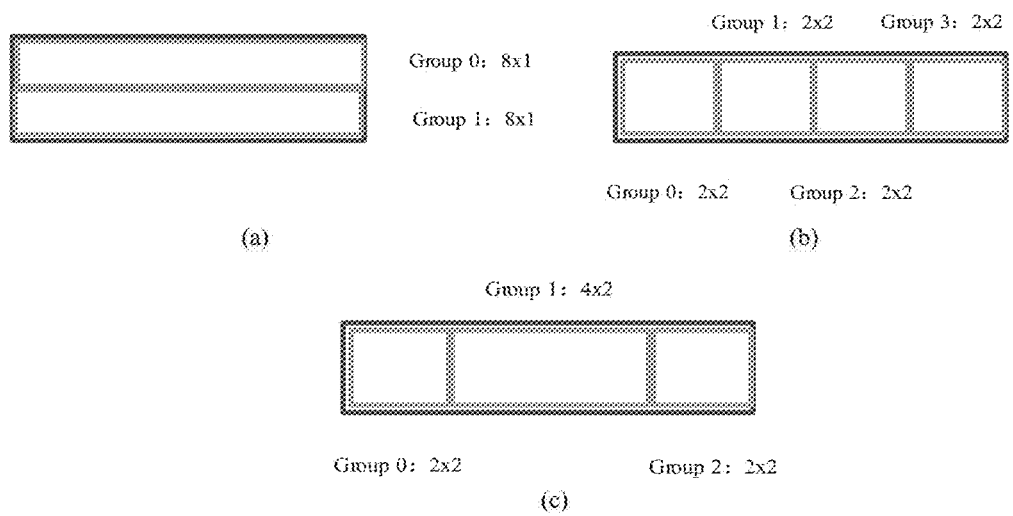

FIG. 28 provides several partition modes of an 8*2 coding unit. (a) schematically shows that the coding unit is vertically and equally partitioned into two Groups. (b) schematically shows that the coding unit is horizontally and equally partitioned into four Groups. (c) schematically shows that the coding unit is horizontally partitioned into three Groups in a ratio of 1:2:1. FIG. 28 further illustrates the size of each Group.

It should be noted that:

On the one hand, for a pixel, pixels closest to the pixel have the highest correlation with the pixel, and when these pixels are used to predict the pixel, an accuracy of the prediction result is higher. The pixels closest to the pixel can include four pixels neighbouring to the pixel in up, down, left and right directions of the pixel, but this is not the case in a specific implementation. In order to cover one or more of these situations, different prediction modes (such as horizontal prediction, vertical prediction, horizontal mean prediction, vertical mean prediction, etc.) can be used to predict different pixels in a coding unit.

On the other hand, considering the parallelism in hardware implementation, different partition groups can perform prediction in parallel, thus improving a coding efficiency or decoding efficiency. For example, referring to FIG. 8, after performing the prediction for Group 0 in FIG. 8, Groups 1-2 may perform the prediction in parallel and Groups 3-4 may perform the prediction in parallel. Other examples are not listed one by one.

Based on the above two aspects (namely, the accuracy of the prediction results and the parallelism of the prediction process), the embodiments of the present disclosure provide the above-mentioned partition modes and the corresponding prediction modes in which the coding units are partitioned into prediction groups, which is helpful to improve the coding efficiency and decoding efficiency. The prediction mode and partition mode can be unrelated. The above-mentioned partition mode and prediction mode are especially suitable for scenes of coding picture with a wide size greater than a high size, in an example, the high size is less than or equal to a certain threshold.

Hereinafter, the residual block grouping solution provided by the embodiment of the present disclosure will be described.

In an example, if the number of pixels contained in one prediction group (or the number of pixels contained in a residual block of one prediction group) is greater than or equal to a preset threshold, the residual block of the prediction group is grouped.

In an example, if the number of pixels contained in one prediction group (or the number of pixels contained in a residual block of one prediction group) less than the preset threshold, the residual block of the prediction group is not grouped.

For example, the preset threshold can be 3 or 4, but it can also be other values.

The first solution is to group a residual block of a first target prediction group. The first target prediction group is a prediction group including a row of pixels or a row of pixels except a first pixel in a coding unit. For example, the first target prediction group may be Group 0 of FIG. 8, any of Groups 1~4 of FIG. 9, FIG. 10, FIG. 13, FIG. 14, Group 0 of FIG. 11, FIG. 12, FIG. 15, any of Groups 1-2 of FIG. 21, FIG. 22, and the like.

In an implementation, the residual block of the first target prediction group is partitioned into one residual sub-block. Which is equivalent to not grouping the residual block.

In another implementation, the residual block of the first target prediction group is partitioned into a plurality of residual sub-blocks.

Partition mode 1: a plurality of residual sub-blocks include a first residual sub-block and a second residual sub-block. Both the first residual sub-block and the second residual sub-block contain consecutive pixels, and a difference between the number of pixels contained in the first residual sub-block and the second residual sub-block is the smallest.

In an example, the residual block of the first target prediction group is partitioned equally or as evenly as possible into two residual sub-blocks.

Partition mode 2: a plurality of residual blocks include a first residual sub-block, a second residual sub-block and a third residual sub-block. The first residual sub-block, the second residual sub-block and the third residual sub-block all contain consecutive pixels, and a difference between the number of pixels contained in the first residual sub-block and a first number is the smallest, the first number is a sum of the number of pixels contained in the second residual sub-block and the third residual sub-block, and the number of pixels contained in the second residual sub-block and the third residual sub-block is equal.

In an example, the residual block of the first target prediction group is partitioned into two parts equally or as evenly as possible, and one part of it is regarded as one residual sub-block, and the other part is partitioned into two residual sub-blocks equally.

Partition mode 3: a plurality of residual blocks include a first residual sub-block, a second residual sub-block and a third residual sub-block. The first residual sub-block, the second residual sub-block and the third residual sub-block all contain consecutive pixels, and a difference between the number of pixels contained in the third residual sub-block and a second number is the smallest, the second number is a sum of the number of pixels contained in the first residual sub-block and the second residual sub-block, and a difference between the number of pixels contained in the first residual sub-block and the second residual sub-block is the smallest.

In an example, the residual block of the first target prediction group is partitioned into two parts equally or as evenly as possible, and one part of it is regarded as one residual sub-block, and the other part is partitioned into two residual sub-blocks as evenly as possible.

Partition mode 4: a plurality of residual blocks include a first residual sub-block, a second residual sub-block, a third residual sub-block and a fourth residual sub-block. The first residual sub-block, the second residual sub-block, the third residual sub-block and the fourth residual sub-block all contain consecutive pixels, and a difference in the number of pixels contained in the first residual sub-block, the second residual sub-block, the third residual sub-block and the fourth residual sub-block is the smallest.

In an example, a residual block of a target prediction group is partitioned equally or as evenly as possible into four parts.

The second solution is to group a residual block of a second target prediction group. The second target prediction group is a prediction group containing a plurality of columns of pixels in a coding unit. For example, the second target prediction group may be any of Groups 1-4 of FIG. 8, FIG. 11, FIG. 12, FIG. 15, any of Groups 1-2 of FIG. 20, FIG. 23, and the like.

In an implementation, the residual block of the second target prediction group is partitioned into one residual sub-block. Which is equivalent to not grouping the residual block.

In another implementation, the residual block of the second target prediction group is partitioned into a plurality of residual sub-blocks.

Partition mode 1: a plurality of residual sub-blocks include at least two residual sub-blocks. Each residual sub-block contains a column of pixels or consecutive columns of pixels, and different residual sub-blocks contain the same number of pixel columns.

Partition mode 2: a plurality of residual blocks include a first residual sub-block, a second residual sub-block and a third residual sub-block. Each residual sub-block contains a column of pixels or consecutive columns of pixels, and the number of pixel columns contained in the first residual sub-block is equal to a sum of the number of pixel columns contained in the second residual sub-block and the third residual sub-block.

Partition mode 3: a plurality of residual sub-blocks include at least four residual sub-blocks. Each residual sub-block contains a column of pixels or consecutive columns of pixels, and different residual sub-blocks contain the same number of pixel columns.

The third solution is to group a residual block of a third target prediction group. The third target prediction group is a prediction group containing a plurality of rows of pixels in a coding unit. For example, the third target prediction group may be the prediction group shown in any one of FIGS. 16-19.

In an implementation, the residual block of the third target prediction group is partitioned into one residual sub-block. Which is equivalent to not grouping the residual block.

In another implementation, the residual block of the third target prediction group is partitioned into a plurality of residual sub-blocks.

Partition mode 1: Each residual block in the plurality of residual sub-blocks includes a row of pixels or a row of pixels except a first pixel.

In an example, the residual block of the third target prediction group is partitioned into a plurality of residual sub-blocks by rows.

Partition mode 2: a plurality of residual blocks include a first residual sub-block, a second residual sub-block and a third residual sub-block. The first residual sub-block includes a prediction group of one row of pixels or one row of pixels other than the first pixel, the second residual sub-block and the third residual sub-block are consecutive pixels in a same row, and a difference in the number of pixels between the second residual sub-block and the third residual sub-block is the smallest.

In an example, the residual block of the third target prediction group is partitioned into a plurality of parts by rows, then one or more parts are respectively used as residual sub-blocks, and the other part or multiple parts are equally partitioned or equally partitioned as far as possible to obtain residual sub-blocks.

Partition mode 3: a plurality of residual blocks include a first residual sub-block, a second residual sub-block, a third residual sub-block and a fourth residual sub-block. The first residual sub-block, the small second residual block, the third residual sub-block and the fourth residual sub-block all contain consecutive pixels, and a difference in the number of pixels contained in the first residual sub-block, the second residual sub-block, the third residual sub-block and the fourth residual sub-block is the smallest.

In an example, the residual block of the third target prediction group is partitioned into a plurality of residual sub-blocks as evenly as possible. For example, it is partitioned into four residual blocks.

The following is an exemplary explanation of the residual block partition mode provided above through specific examples.

Figure 29:
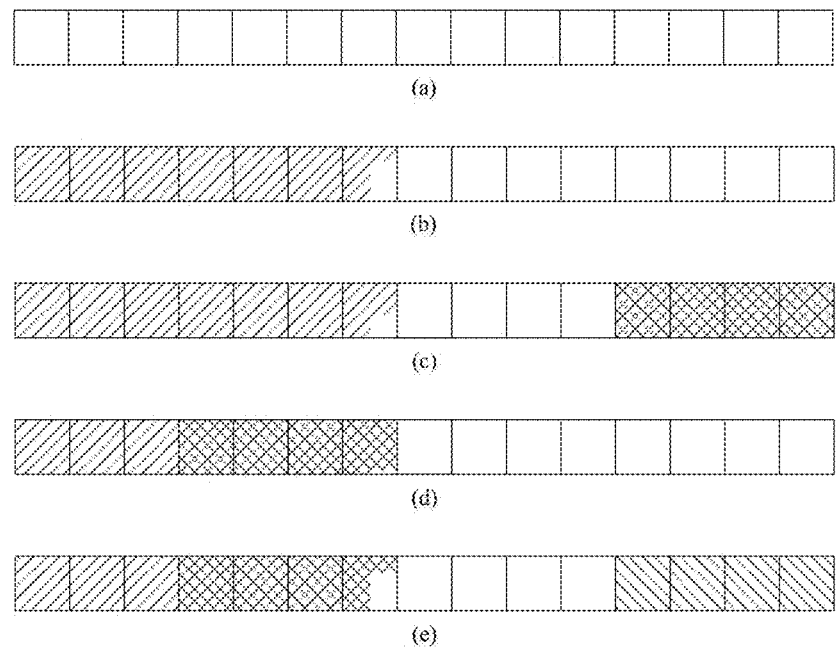
FIGS. 29-31 are schematic diagrams of various residual block groupings of a prediction group according to an embodiment of the present disclosure.

Example 1: As shown in FIG. 29, FIG. 29 is a schematic diagram of various residual block groupings of a prediction group according to an embodiment of the present disclosure. FIG. 29 is an example in which a size of the coding unit is 16*4 and the prediction group is an element other than a first element in a first row of the coding unit. For example, the prediction group may be Group 0 in FIG. 8 or FIG. 11, or any of Groups 1~4 in FIG. 9 or FIG. 10.

Each of (a)-(e) in FIG. 29 represents a residual block partition mode. Each small grid in each graph represents a pixel, and a same type of small grid represents a pixel in a same residual block. For example, (b) indicates that the residual block is partitioned into two residual sub-blocks, one of which contains first seven pixels marked by left diagonal lines and the other contains last eight pixels marked by the blank.

Figure 30:
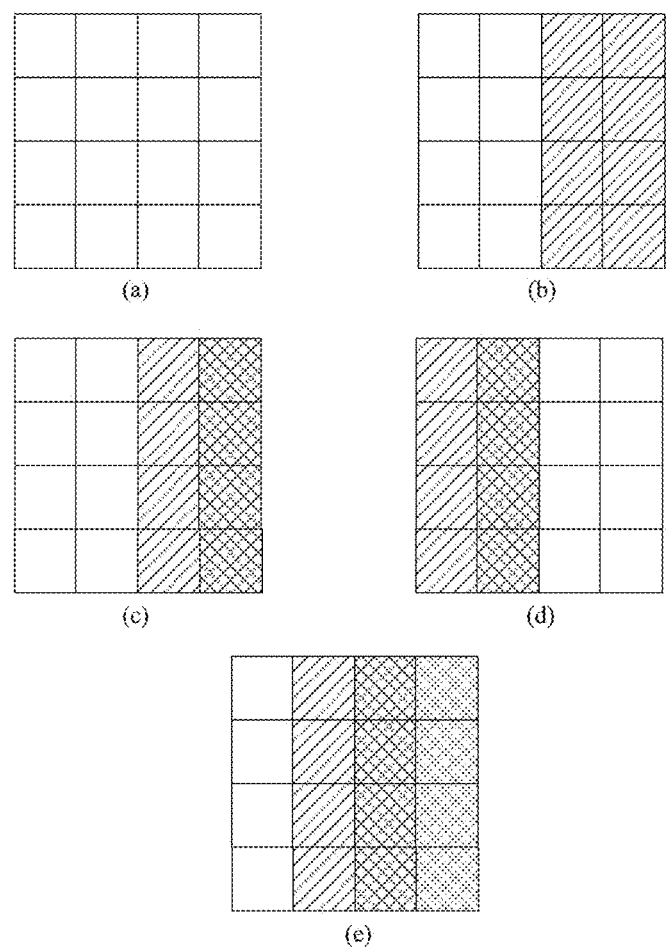

Example 2: As shown in FIG. 30, FIG. 30 is a schematic diagram of various residual block groupings of a prediction group according to an embodiment of the present disclosure. FIG. 30 is an example in which a size of the coding unit is 16*4 and the prediction group being a 4-column element of the coding unit. For example, the prediction group can be any one of Groups 1~4 in FIG. 8 or FIG. 11.

Each of (a)-(e) in FIG. 30 represents a residual block partition mode. Each small grid in each graph represents a pixel, and a same type of small grid represents a pixel in a same residual block.

In an example, coefficient coding methods of pixels in a same sub residual block are the same, or coding lengths (CLs) of pixels in the same sub residual block, that is, the number of bits occupied by residual coefficients after coding, are the same.

In an example, both FIG. 29 and FIG. 30 illustrate five partition modes of the residual block. In an example, 1 bit or 3 bits can be used to represent a partition mode GPM (as shown in Table 1). GP0-GP4 may correspond to (a)-(c) in FIG. 29 or (a)-(e) in FIG. 30, respectively.

TABLE

| GPM index coding method (conventional binary coding method) | | | | | |
|---|---|---|---|---|---|
| GPM | GP0 | GP1 | GP2 | GP3 | GP4 |
| Coding bit | 0 | 100 | 101 | 110 | 111 |

It should be noted that an index coding method of a residual block partition mode shown in Table 1 can also be applied to other embodiments. For example, the method can be applied to a partition mode of a residual block of a prediction group with other size, and other partition modes of the above prediction groups.

Figure 31:
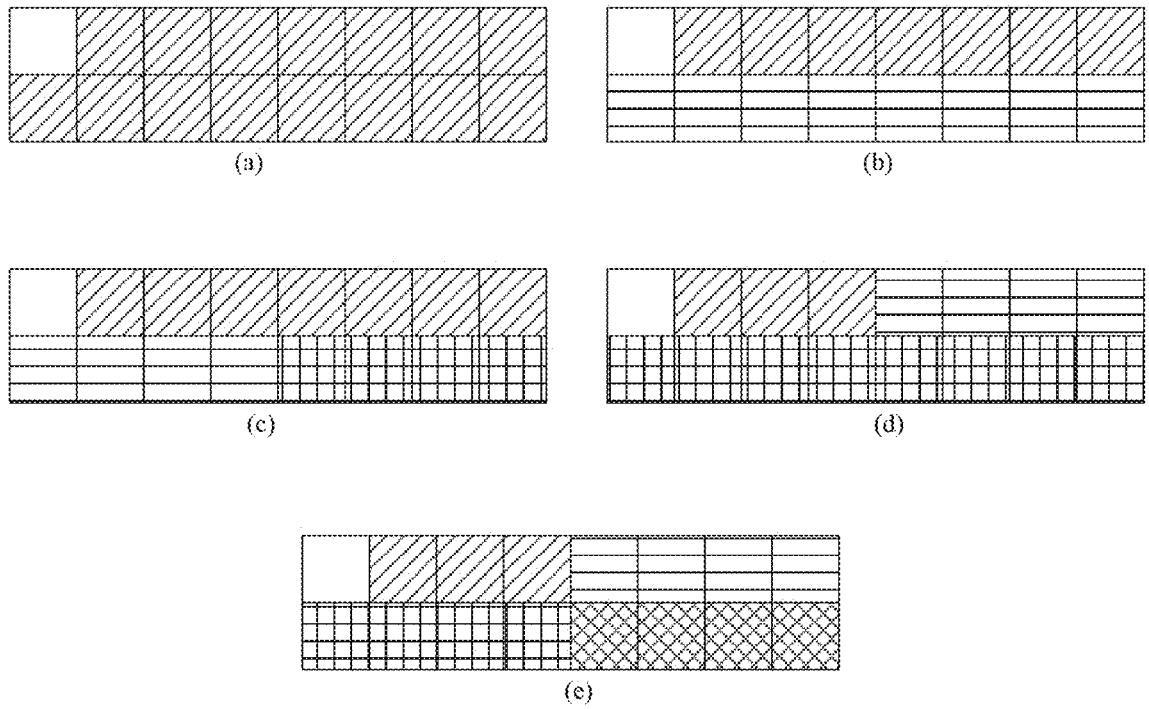

Example 3: As shown in FIG. 31, FIG. 31 is a schematic diagram of various residual block groupings of a prediction group according to an embodiment of the present disclosure. FIG. 31 is an example in which a size of the coding unit is 8*2 and the coding unit is partitioned into one prediction group. A first pixel in each of (a)-(e) in FIG. 31 is not a pixel in a residual block of the prediction group, that is, it does not participate in the grouping of the residual block. The prediction group involved in FIG. 31 may be the prediction group in FIG. 16 or FIG. 17. In any figure in (a)-(e), the pixels with the same shading mark represent pixels in the same residual block.

For FIG. 31, the coding unit is only partitioned into one prediction group, and the residual block of the prediction group share five partition modes (i.e., GPM). For these five types of GPM, 1 bit or 3 bit is required to represent the partition method (also shown in Table 1).

Figure 32:
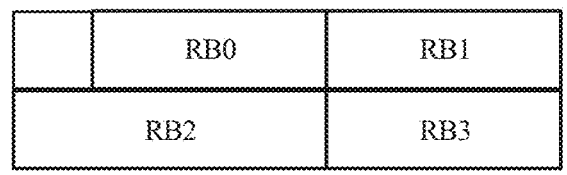
FIG. 32 is a schematic diagram of a correspondence between a residual block and a residual sub-block according to an embodiment of the present disclosure.

A coding order of residual sub-blocks (RB) in the same prediction group is from top to bottom and from left to right. Taking (e) in FIG. 31 as an example, the coding order of each RB is RB0-RB3 in order, as shown in FIG. 32. It should be noted that the coding order of residual sub-blocks in other embodiments, similar to that in FIG. 32, can be obtained by reasoning based on the accompanying drawings shown in FIG. 32, and will not be repeated herein.

It should be noted that when a residual block is partitioned into a large number of residual sub-blocks, there is more partition mode information to be coded, and when a residual block is partitioned into a small number of residual sub-blocks, the residuals with different characteristics are grouped together, which results in low coding efficiency of residual coefficients. Considering at least these two aspects, the embodiment of the present disclosure provides the above residual block partition method.

In the following, other steps involved in the video image coding and decoding process are exemplarily described: First, regarding a high-level syntax embodiment.

The high-level syntax provides unified information for a covered region. In the coding and decoding process of all pixels in the covered region, the required unified information can be obtained through high-level syntax. In this way, on the one hand, these pieces of information are only coded once within a certain region, which can effectively save bit rates. On the other band, because this information is relatively important, it can be transmitted in a specific set, which can be protected differently from other ordinary data. For example, the following syntax regions can be: parallel coding unit, independent coding unit, coding unit, PG, RB, or picture, picture sequence, etc.

This high-level syntax can be coded and decoded using either fixed length coding method or truncated unary code coding method.

1) Maximum Error

Adding a max_distance syntax to a region header, which characterizes a maximum error of a block within a region as max_distance, indicating that a difference between a reconstructed pixel value and an original pixel value for any pixel of a current slice is less than or equal to max_distance; or that a square of the difference between the reconstructed pixel value and the original pixel value for any pixel of the current slice is less than or equal to max_distance.

2) Quantization Parameter

A quantization_parameter syntax is added to a region header to characterize a quantization step used by a block within a region. The quantization step is used to quantize residual coefficients, or coefficients after residual transformation, so as to reduce bit rate overhead.

When coding quantization_parameter syntax, quantization_parameter is 0, that is, the probability of not quantizing is high, and shorter codewords should be allocated. That is, the quantization_parameter is indicated as 0 by a shorter codeword. An example is: binary 0 means that quantization_parameter is 0, and binary 1*** means that quantization_parameter is greater than 0 (* means 0 or 1).

3) Bit Depth

A bit_depth syntax is added to a certain region header (preferably a picture header or a picture sequence header) to represent a bit depth of a block within a certain region. The bit depth indicates how many bits are used to code a pixel value of each pixel, and a bit depth of N bits indicates that a range of the pixel value is [0, $2^N$−1], e.g., a bit depth of 8 bits indicates that the range of the pixel value is [0, 255].

4) Whether to Code an Original Value Flag

An org_flag syntax (binary, i.e., only 0 and 1 values) is added to a certain region header to indicate whether a block within a region directly code an original pixel value. If org_flag is 1, the block within the certain region codes the original value directly, i.e., each pixel is coded directly using a bit_depth bit without passing additional information such as prediction information, prediction value, residual information, etc. The method is designed to avoid data over-inflation (i.e., compressed data is instead significantly larger than original data) when the above prediction methods are useless (e.g., some picture blocks with relatively high noise).

5) Basic Picture Information

A basic information syntax of a picture is added to a certain region header (preferably a picture header or a picture sequence header) to represent basic information of the picture, such as resolution (i.e. width and height of the picture), picture luma and chroma format (YUV 444, YUV 420, YUV 422, RGB 444, etc.), etc.

6) Importance of Each Component

If a picture consists of multiple components, relevant syntax for the importance of each component is added to a certain region header (preferably a picture header or a picture sequence header). If luma_weight syntax is added, it indicates that an importance ratio of three YUV components in the picture is luma_weight: 1:1.

7) Parallel Coding Unit Syntax and Restriction

At a picture header or a picture sequence header, size related information of parallel independent coding units is transmitted.

Option 1: Width para_unit_width and height para_unit_height of parallel independent coding units are transmitted. The picture is partitioned into a plurality of parallel independent coding units with the same size (except parallel independent coding units at the end of each row and the end of each column).

Option 2: The number of coding units (or independent coding units) N_CU contained in the parallel independent coding unit are transmitted. The picture is partitioned into a plurality of parallel independent coding units with the same number of coding units (except parallel independent coding units at the end of each row and the end of each column).

Blocks within different parallel coding units cannot refer to each other to ensure parallel coding and decoding.

8) Length Map Output

At a picture header or a picture sequence header, length map information is transmitted, which is used to store offset information between an initial bit stream of each independent coding unit and an initial bit stream of a current picture. This offset needs to be aligned by K (K is preferably 8 or 16) bytes. The length map information is used for a random index of each independent coding unit in the current picture, that is, when information of any independent coding unit in the picture needs to be obtained, it is not necessary to decode all independent coding unit bit streams in front of it.

Second, handling special circumstances.

1) End-of-Row Filling Let dimensions of a basic processing unit be width w_unit and height h_unit.

If the width of the picture is not an integer multiple of w_unit or the height of the picture is not an integer multiple of h_unit, a nearest neighbour method is used to fill it so that the width is an integer multiple of w_unit or the height is an integer multiple of h_unit (a right boundary of the picture is filled by copying available pixels of the left nearest neighbour, and a lower boundary of the picture is filled by copying available pixels of the upper nearest neighbour), and then coding is performed according to a conventional method.

2) End-of-Row or End-of-Picture Bit Stream Filling

At the end of the last block of a row (or picture), if a total number of accumulated bit streams before the current block is not a multiple of 8 bit, it will be filled by adding 0 or 1 to make the total number of accumulated bit streams byte-aligned.

3) Residual Information Writing

Considering hardware requirements, the residual is written with F×F (F is preferably 4 or 2) as a basic unit, rather than in a raster scanning order from top to bottom and from left to right.

It should be noted that some or all of the features in the above embodiments can be combined in any suitable way to obtain a new embodiment without conflict.

It can be understood that in order to realize the functions in the above-mentioned embodiments, the video coder/video decoder includes corresponding hardware structures and/or software modules for performing various functions. Those skilled in the art should easily realize that the present disclosure can be implemented in hardware or in the form of a combination of hardware and computer software in combination with the example units and method steps described in the embodiments disclosed in the present disclosure. Whether a function is executed by hardware or computer software drives hardware depends on the specific application scenarios and design constraints of the technical solution.

Figure 33:
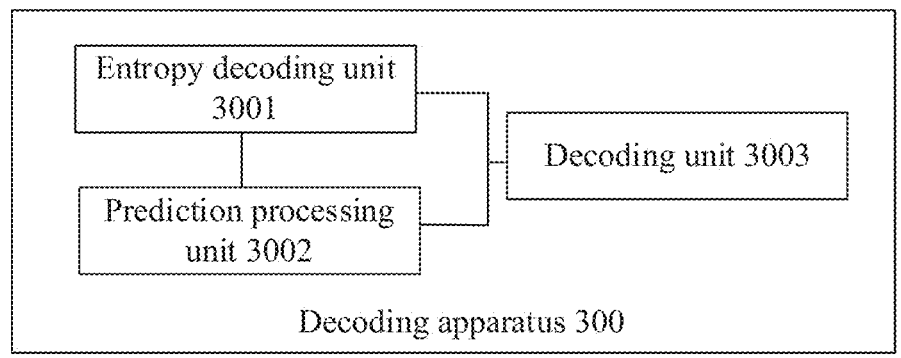
FIG. 33 is a schematic structure of a decoding apparatus according to an embodiment of the present disclosure.

FIG. 33 is a schematic structure of a decoding apparatus 300 according to an embodiment of the present disclosure, and any of the above decoding method embodiments can be executed by the decoding apparatus. The decoding apparatus 300 includes an entropy decoding unit 3001, a prediction processing unit 3002 and a decoding unit 3003. In an example, the decoding apparatus may be the destination device 12 in FIG. 1. In another example, the decoding apparatus may be the decoder 122 in FIG. 1 or the decoder 30 in FIG. 3.

In one example, the entropy decoding unit 3001 may be implemented by the entropy decoding unit 301 in FIG. 3. The prediction processing unit 3002 can be realized by the prediction processing unit 302 in FIG. 3. The decoding unit 3003 can be realized by the reconstruction unit 305 in FIG. 3, and in an example, the decoding unit 3003 can further be realized by the reconstruction unit 305 and the filter unit 306 in FIG. 3. The current picture block in FIG. 3 may be a to-be-decoded unit in this embodiment.

The entropy decoding unit 3001 is configured to parse a bit stream to obtain a syntax element, where the syntax element is configured to obtain a residual block of a to-be-decoded unit, and the to-be-decoded unit includes at least one prediction group. For example, the entropy decoding unit 3001 may be configured to perform S201 in FIG. 7.

The prediction processing unit 3002 is configured to determine, for any one prediction group in the at least one prediction group, a prediction mode of the prediction group, and obtain, for any one prediction group in the at least one prediction group, a prediction value of the prediction group by performing prediction for the prediction group with the prediction mode. For example, the prediction processing unit 3002 can be configured to perform S202-S203 in FIG. 7.

The decoding unit 3003 is configured to decode the to-be-decoded unit based on the residual block of the to-be-decoded unit and the prediction value of the any one prediction group. For example, the decoding unit 3003 may be configured to perform S204 in FIG. 7.

More detailed descriptions of the above entropy decoding unit 3001, prediction processing unit 3002, and decoding unit 3003 and descriptions of their beneficial effects can be obtained directly by referring directly to the relevant descriptions in the method embodiment shown in FIG. 7, and will not be repeated here.

Figure 34:
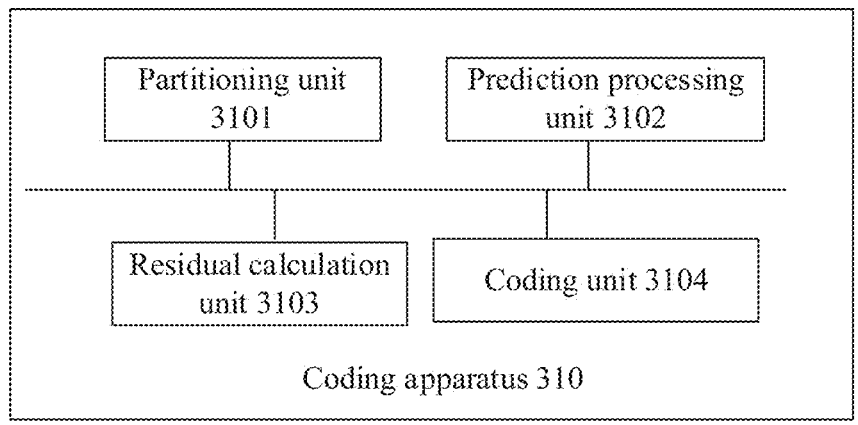
FIG. 34 is a schematic structural diagram of a coding apparatus according to an embodiment of the present disclosure.

FIG. 34 is a schematic structural diagram of a coding apparatus 310 according to an embodiment of the present disclosure. The coding apparatus 310 includes a partitioning unit 3101, a prediction processing unit 3102, a residual calculation unit 3103 and a coding unit 3104. In an example, the coding apparatus may be the source device 11 in FIG. 1. In another example, the coding apparatus may be the coder 112 in FIG. 1 or the coder 20 in FIG. 2.

In an example, the prediction processing unit 3102, the residual calculation unit 3103 and the coding unit 3104 can be realized by the prediction processing unit 201, the residual calculation unit 202 and the entropy coding unit 205 in FIG. 2, respectively. It should be noted that the partitioning unit 3101 can be a unit configured to obtain the current picture block in FIG. 2. The current picture block in FIG. 2 may be a coding unit in this embodiment.

More detailed descriptions of the above partitioning unit 3101, prediction processing unit 3102, residual calculation unit 3103 and coding unit 3104 and descriptions of their beneficial effects can be obtained directly by referring directly to the relevant descriptions in the method embodiment shown in FIG. 5, and will not be repeated here.

Figure 35:
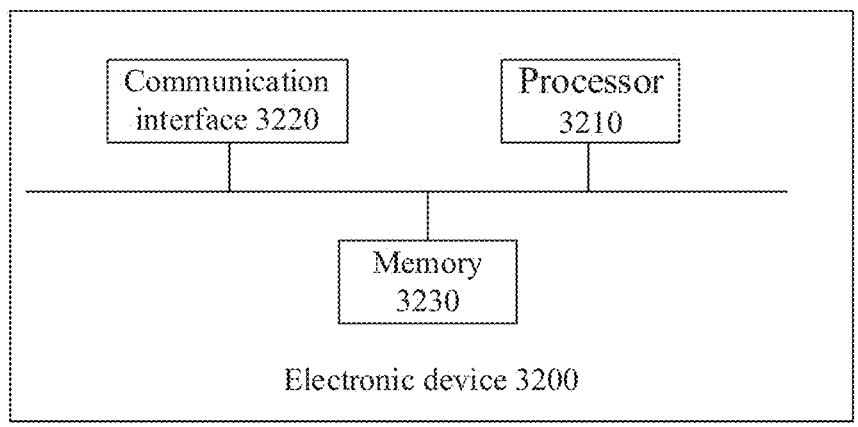
FIG. 35 is a schematic structural diagram of an electronic device according to an embodiment of the present disclosure.

The present disclosure further provides an electronic device, which is configured to execute any of the decoding method embodiments described above. As shown in FIG. 35, FIG. 35 is a schematic structural diagram of an electronic device provided by the present disclosure. The electronic device 3200 includes a processor 3210 and a communication interface 3220. The processor 3210 and the communication interface 3220 are coupled to each other. It can be understood that the communication interface 3220 can be a transceiver or an input-output interface. In an example, the electronic device 3200 may further include a memory 3230 for storing instructions executed by the processor 3210 or input data required by the processor 3210 to run the instructions, or data generated after the processor 3210 runs the instructions.

When the electronic device 3200 is configured to implement the method shown in FIG. 7, the processor 3210 and the communication interface 3220 are configured to perform the functions of the entropy decoding unit 3001, the prediction processing unit 3002 and the decoding unit 3003 described above.

When the electronic device 3200 is configured to implement the method shown in FIG. 5, the processor 3210 and the communication interface 3220 are configured to perform the functions of the partitioning unit 3101, the prediction processing unit 3102, the residual calculation unit 3103 and the coding unit 3104.

A specific connection medium among the communication interface 3220, the processor 3210 and the memory 3230 is not limited in the embodiment of the present disclosure. In the embodiment of the present disclosure, the communication interface 3220, the processor 3210 and the memory 3230 are connected by a bus 3240 in FIG. 35, and the bus is indicated by a thick line in FIG. 35. Connection modes of other components are only for schematic illustration and are not limited. The bus can be divided into address bus, data bus, control bus, etc. For convenience of representation, only one thick line is used in FIG. 35, but it does not mean that there is only one bus or one type of bus.

The memory 3230 can be configured to store software programs and modules, such as program instructions/modules corresponding to the decoding method or coding method provided by the embodiments of the present disclosure. The processor 3210 executes various functional applications and data processing by executing the software programs and modules stored in the memory 3230. The communication interface 3220 can be configured to communicate signaling or data with other devices. In the present disclosure, the electronic device 3200 may have a plurality of communication interfaces 3220.

It can be understood that the processor in the embodiment of the present disclosure can be a central processing Unit (CPU), a neural processing unit (NPU) or a graphic processing unit (GPU), or may be other general-purpose processors, a digital signal processor (DSP), an application specific integrated circuit (ASIC), a field programmable gate array (FPGA), or other programmable logic devices, a transistor logic device, a hardware component or any combination thereof. The general-purpose processor can be a microprocessor or any conventional processor.

The method steps in the embodiment of the present disclosure can be realized by hardware, or by a processor executing software instructions. Software instructions can be composed of corresponding software modules, which can be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a CD-ROM, or any other form of storage media known in the art. An exemplary storage medium is coupled to a processor such that the processor is capable of reading information from the storage medium and may write information to the storage medium. The storage medium can also be an integral part of the processor. The processor and the storage medium can be located in an ASIC. In addition, the ASIC can be located in a network device or a terminal device. The processor and the storage medium can also exist as separate components in the network device or the terminal device.

In the above embodiments, it can be realized in whole or in part by software, hardware, firmware or any combination thereof. When implemented using software, it may be implemented in whole or in part in the form of a computer program product. The computer program product includes one or more computer programs or instructions. When the computer program or instruction is loaded and executed on the computer, the processes or functions described in the embodiment of the present disclosure is fully or partially executed. The computer can be a general-purpose computer, a special-purpose computer, a computer network, a network device, user equipment or other programmable apparatuses. The computer program or instructions can be stored in a computer-readable storage medium or transmitted from one computer-readable storage medium to another. For example, the computer program or instructions can be transmitted from one website, computer, server or data center to another website, computer, server or data center by wired or wireless means. The computer-readable storage medium may be any available medium that can be accessed by a computer or a data storage device such as a server, data center, etc. that integrates one or more available media. The available medium can be a magnetic medium, such as a floppy disk, a hard disk, a magnetic tape. It can also be an optical medium, such as a digital video disc (DVD). It can also be a semiconductor medium, such as a solid state drive (SSD).

In various embodiments of the present disclosure, if there is no special explanation and logical conflict, the terms and/or descriptions between different embodiments are consistent and can be quoted from each other, and technical features in different embodiments can be combined to form a new embodiment according to their inherent logical relationship. In the present disclosure, "at least one" refers to one or more, and "multiple" refers to two or more. "And/or", which describes the relationship of related objects, means that there can be three kinds of relationships, for example, A and/or B, which can mean that A exists alone, A and B exist together, and B exists alone, where A and B can be singular or plural. In the textual description of the present disclosure, the character "/" generally indicates that the front and rear associated objects are in an "or" relationship; in the formula of the present disclosure, the character "/" indicates that the front and rear associated objects are in a "divide" relationship.

It can be understood that various numerical numbers involved in the embodiments of the present disclosure are only for the convenience of description and are not used to limit the scope of the embodiments of the present disclosure. The sequence number of the above-mentioned processes does not mean the order of execution, and the order of execution of each process should be determined by its function and internal logic.

The invention claimed is:

1. A picture decoding method, comprising:
parsing a bit stream to obtain a syntax element, wherein the syntax element is configured to obtain a residual block of a to-be-decoded unit, and the to-be-decoded unit comprises at least one prediction group;
for a prediction group in the at least one prediction group, determining a prediction mode of the prediction group;
obtaining a prediction value of the prediction group by performing prediction for the prediction group with the prediction mode; and
decoding the to-be-decoded unit based on the residual block of the to-be-decoded unit and a corresponding prediction value of each prediction group in the at least one prediction group,
wherein the at least one prediction group comprises a plurality of prediction groups, and at least two prediction groups in the plurality of prediction groups have different prediction modes, wherein the to-be-decoded unit comprises a first prediction group and a second prediction group, the first prediction group comprises odd columns of pixels and the second prediction group comprises even columns of pixels, a prediction mode for the first prediction group is a vertical prediction, a prediction mode for pixels in non-last columns of the second prediction group is a horizontal mean prediction, and a prediction mode for pixels in a last column of the second prediction group is a horizontal prediction.

2. The method according to claim 1, wherein the prediction group in the at least one prediction group is a chroma prediction group or a luma prediction group.

3. The method according to claim 1, wherein the syntax element further comprises at least one of:
identification information of a partitioning mode for the to-be-decoded unit, wherein the partitioning mode indicates a partitioning mode for partitioning the to-be-decoded unit into the at least one prediction group; or
the prediction mode of the prediction group in the at least one prediction group.

4. The method according to claim 1, wherein the syntax element further comprises a first indicator to indicate whether to perform grouping on the residual block or not.

5. The method according to claim 4, wherein the residual block comprises a luma residual block or a chroma residual block.

6. The method according to claim 1, wherein the residual block is a residual block of to-be-decoded unit granularity or a residual block of prediction block granularity.

7. A picture coding method, comprising:
partitioning a coding unit into at least one prediction group;
for a prediction group in the at least one prediction group, obtaining a prediction value of the prediction group by performing prediction for the prediction group with a corresponding prediction mode;
obtaining a residual block of the coding unit based on a corresponding prediction value of each prediction group in the at least one prediction group; and
coding the residual block of the coding unit,
wherein the at least one prediction group comprises a plurality of prediction groups, and at least two prediction groups in the plurality of prediction groups have different prediction modes, wherein the to-be-decoded unit comprises a first prediction group and a second prediction group, the first prediction group comprises odd columns of pixels and the second prediction group comprises even columns of pixels, a prediction mode for the first prediction group is a vertical prediction, a prediction mode for pixels in non-last columns of the second prediction group is a horizontal mean prediction, and a prediction mode for pixels in a last column of the second prediction group is a horizontal prediction.

8. A picture codec system, comprising:
a decoding device configured to realize the method according to claim 1; and
a coding device, wherein the coding device is in communication connection with the decoding device, and the coding device is configured to realize the method according to claim 7.

9. An electronic device, comprising:
at least one processor; and
at least one memory, wherein the at least one memory is configured to store computer instructions, and the at least one processor is configured to call and run the computer instructions from the at least one memory, and is configured to:
parse a bit stream to obtain a syntax element, wherein the syntax element is configured to obtain a residual block of a to-be-decoded unit, and the to-be-decoded unit comprises at least one prediction group;
for a prediction group in the at least one prediction group, determine a prediction mode of the prediction group;
obtain a prediction value of the prediction group by performing prediction for the prediction group with the prediction mode; and
decode the to-be-decoded unit based on the residual block of the to-be-decoded unit and the prediction value of each prediction group in the at least one prediction group;
wherein the at least one prediction group comprises a plurality of prediction groups, and at least two prediction groups in the plurality of prediction groups have different prediction modes, wherein the to-be-decoded unit comprises a first prediction group and a second prediction group, the first prediction group comprises odd columns of pixels and the second prediction group comprises even columns of pixels, a prediction mode for the first prediction group is vertical prediction, a prediction mode for pixels in non-last columns of the second prediction group is horizontal mean prediction, and a prediction mode for pixels in last column of the second prediction group is horizontal prediction.

10. A non-transitory computer-readable storage medium, wherein a computer program or instruction is stored in the storage medium, and when the computer program or instruction is executed by an electronic device, the method according to claim 1 is realized.

11. The electronic device according to claim 9, wherein the prediction group in the at least one prediction group is a chroma prediction group or a luma prediction group.

12. The electronic device according to claim 9, wherein the syntax element further comprises at least one of:
identification information of a partitioning mode for the to-be-decoded unit, wherein the partitioning mode indicates a partitioning mode for partitioning the to-be-decoded unit into the at least one prediction group; or,
the prediction mode of the prediction group in the at least one prediction group.

13. The electronic device according to claim 9, wherein the syntax element further comprises a first indicator to indicate whether to perform grouping on the residual block or not.

14. The electronic device according to claim 9, wherein the residual block comprises a luma residual block or a chroma residual block.

15. The electronic device according to claim 9, wherein the residual block is a residual block of to-be-decoded unit granularity or a residual block of prediction block granularity.

16. The method according to claim 1, wherein a width of the to-be-decoded unit is larger than a height of the to-be-decoded unit, and the height is smaller than or equal to a preset threshold.

* * * * *